US009053385B2

(12) United States Patent
Nosaka

(10) Patent No.: US 9,053,385 B2
(45) Date of Patent: Jun. 9, 2015

(54) OBJECT DETECTION DEVICE AND OBJECT DETECTION METHOD

(71) Applicant: PANASONIC CORPORATION, Osaka (JP)

(72) Inventor: Kenichiro Nosaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/365,534

(22) PCT Filed: Dec. 11, 2012

(86) PCT No.: PCT/JP2012/007897
§ 371 (c)(1),
(2) Date: Jun. 13, 2014

(87) PCT Pub. No.: WO2013/094151
PCT Pub. Date: Jun. 27, 2013

(65) Prior Publication Data
US 2015/0003743 A1    Jan. 1, 2015

(30) Foreign Application Priority Data

Dec. 19, 2011    (JP) ................................. 2011-277550

(51) Int. Cl.
| G06K 9/62 | (2006.01) |
| G06K 9/46 | (2006.01) |
| G08B 13/196 | (2006.01) |

(Continued)

(52) U.S. Cl.
CPC .......... *G06K 9/468* (2013.01); *G08B 13/19604* (2013.01); *G06T 7/2053* (2013.01); *G06T 2207/10048* (2013.01); *G06T 2207/30196* (2013.01); *G06K 9/52* (2013.01); *G06K 2009/4666* (2013.01)

(58) Field of Classification Search
None
See application file for complete search history.

(56) References Cited

U.S. PATENT DOCUMENTS 5,748,775 A * 5/1998 Tsuchikawa et al. ......... 382/190
6,088,468 A * 7/2000 Ito et al. ........................ 382/103

(Continued)

FOREIGN PATENT DOCUMENTS

| JP | 08-069523 A | 3/1996 |
| JP | 10-208057 A | 8/1998 |

(Continued)

OTHER PUBLICATIONS

International Search Report issued in PCT/JP2012/007897, dated Mar. 5, 2013, with English translation.

*Primary Examiner* — Brian P Werner
(74) *Attorney, Agent, or Firm* — McDermott Will Emery LLP

(57) ABSTRACT

An object detection device includes: a binary difference image generation unit for generating a binary difference image C by binarizing a difference value between a background image B, which is an image as a reference for the absence of a detection target object in the detection area, and a detection target image F which is an image as a detection target to detect a detection target object in the detection area; a binary second derivative image generation unit for generating a binary second derivative image D by binarizing second derivatives of the detection target image F or of a smoothed image F', obtained by smoothing the detection target image F; and an object detection unit for detecting the detection target object based on a logical product of the binary difference image C and the binary second derivative image D.

20 Claims, 10 Drawing Sheets

(51) Int. Cl.
*G06T 7/20* (2006.01)
*G06K 9/52* (2006.01)

(56) References Cited

U.S. PATENT DOCUMENTS 7,596,240 B2 * 9/2009 Ito et al. ............... 382/103
8,340,368 B2 * 12/2012 Lee et al. .............. 382/118

2008/0187219 A1 * 8/2008 Chen et al. ............ 382/173
2010/0182433 A1 * 7/2010 Shimbo et al. ........ 348/153

FOREIGN PATENT DOCUMENTS

| | | |
|---|---|---|
| JP | 2002-304677 A | 10/2002 |
| JP | 2004-295775 A | 10/2004 |
| JP | 2010-256194 A | 11/2010 |

* cited by examiner

FIG. 9

$$\begin{array}{|c|c|c|}\hline -1 & 0 & -1 \\\hline -1 & 6 & -1 \\\hline -1 & 0 & -1 \\\hline\end{array}$$

with labels $m_{1,1}, m_{1,2}, m_{1,3}, m_{2,1}, m_{2,2}, m_{2,3}, m_{3,1}, m_{3,2}, m_{3,3}$

FIG. 10

$$\begin{array}{|c|c|c|}\hline -1 & -1 & -1 \\\hline 0 & 6 & 0 \\\hline -1 & -1 & -1 \\\hline\end{array}$$

with labels $n_{1,1}, n_{1,2}, n_{1,3}, n_{2,1}, n_{2,2}, n_{2,3}, n_{3,1}, n_{3,2}, n_{3,3}$

FIG. 11A $$\begin{array}{|c|c|c|}\hline 0 & 0 & 0 \\\hline -1 & 2 & -1 \\\hline 0 & 0 & 0 \\\hline\end{array}$$

FIG. 11B $$\begin{array}{|c|c|c|}\hline -1 & 0 & -1 \\\hline -2 & 8 & -2 \\\hline -1 & 0 & -1 \\\hline\end{array}$$

FIG. 12A $$\begin{array}{|c|c|c|}\hline 0 & -1 & 0 \\\hline 0 & 2 & 0 \\\hline 0 & -1 & 0 \\\hline\end{array}$$

FIG. 12B $$\begin{array}{|c|c|c|}\hline -1 & -2 & -1 \\\hline 0 & 8 & 0 \\\hline -1 & -2 & -1 \\\hline\end{array}$$

OBJECT DETECTION DEVICE AND OBJECT DETECTION METHOD

RELATED APPLICATIONS

This application is the U.S. National Phase under 35 U.S.C. §371 of International Application No. PCT/JP2012/007897, filed on Dec. 11, 2012, which in turn claims the benefit of Japanese Application No. 2011-277550, filed on Dec. 19, 2011, the disclosures of which Applications are incorporated by reference herein.

TECHNICAL FIELD

The present invention relates to an object detection device and an object detection method using background subtraction.

BACKGROUND ART

An object detection method using background subtraction is known as a conventional object detection method (for example, refer to Japanese Unexamined Patent Application Publication No. 2010-256194). The object detection method using background subtraction detects a detection target object based on a difference between a background image (image as a reference for the absence of a detection target object) and a detection target image (image as a detection target to detect the detection target object). More specifically, an area where a difference value between the background image and the detection target image is above a predetermined threshold is determined as a detection target object. The object detection method using background subtraction is a simple method, and is generally used as an object detection method where stable background images can be obtained.

On the other hand, there is a method which performs Gaussian filtering on an image to smooth the image, and then performs Laplacian filtering on the smoothed image to obtain second derivatives of the smoothed image. This method is commonly called LoG filtering, and is often used, for example, to detect an edge of an image (detect an area where the intensity changes significantly).

This method using LoG filtering, while often used e.g. to detect an edge of an image, can be applied e.g. to the case of detecting a detection target object where the detection target object is assumed to be a hot body, and the detection target image is assumed to show a temperature distribution. More specifically, a detection target image showing a temperature distribution has negative second derivatives in an area where the temperature increasing rate decreases. Now consider the case where the detection target image showing a temperature distribution has a low pixel resolution, causing the detection target object to be in an area of several to ten and several pixels. In this case, the second derivatives of the detection target image are negative in the area where the detection target object is present. Thus, in this case, the detection target object can be detected by performing LoG filtering described above on the detection target image to obtain second derivatives of the detection target image, and by using the second derivatives. More specifically, an area where the second derivatives are lower than a predetermined threshold (0 or a predetermined negative value) can be determined as the detection target object.

SUMMARY OF THE INVENTION

Problem(s) to be Solved by the Invention

However, according to the conventional object detection method using background subtraction described above, there is a possibility that if multiple detection target objects are present (particularly if the detection target objects that are present are close to each other), the multiple detection target objects may be detected as one detection target object. Further, according to the object detection method using the LoG filtering (based on second derivatives), if an area having a higher temperature than ambient (area with a negative second derivative) is present other than the detection target object, something other than the detection target object is erroneously detected as a detection target object.

The present invention has been made to solve the problems described above, and has an object to provide an object detection device and an object detection method which make it possible that even if multiple detection target objects are present in a detection area, the respective detection target objects can be separately detected.

Means to Solve the Problem(s)

In order to achieve the above object, an object detection device according to an aspect of the present invention comprises: a binary difference image generation unit for generating a binary difference image by binarizing a difference value, with a predetermined threshold for the difference value, between: a background image which is an image showing a temperature distribution in a detection area and which is an image as a reference for the absence of a detection target object in the detection area; and a detection target image which is an image showing a temperature distribution in the detection area and which is an image as a detection target to detect a detection target object in the detection area; a binary second derivative image generation unit for generating a binary second derivative image by binarizing second derivatives of the detection target image or of a smoothed image, obtained by smoothing the detection target image, with a predetermined threshold for the derivative; and an object detection unit for detecting the detection target object based on a logical product of the binary difference image and the binary second derivative image.

The object detection device can be designed such that it detects the detection target object having a higher temperature than background temperature in the detection area, wherein the binary difference image generation unit sets an area to a first value where the difference value obtained by subtracting the background image from the detection target image is equal to or higher than the threshold for the difference value, and further sets an area to a second value where the difference value obtained by subtracting the background image from the detection target image is lower than the threshold for the difference value, so as to generate the binary difference image, and wherein the binary second derivative image generation unit sets the threshold for the derivative to 0, and sets an area in the detection target image or the smoothed image to the first value where its second derivatives are lower than the threshold for the derivative, or where its second derivatives are equal to or lower than the threshold for the derivative, while setting the other area therein to the second value, so as to generate the binary second derivative image.

The object detection device can be designed such that it detects the detection target object having a higher temperature than background temperature in the detection area, wherein the binary difference image generation unit sets an area to a first value where the difference value obtained by subtracting the detection target image from the background image is equal to or higher than the threshold for the difference value, and further sets an area to a second value where the difference value obtained by subtracting the detection target image from the background image is lower than the threshold for the difference value, so as to generate the binary difference image, and wherein the binary second derivative image generation unit sets the threshold for the derivative to 0, and sets an area in the detection target image or the smoothed image to the first value where its second derivatives are higher than the threshold for the derivative, or where its second derivatives are equal to or higher than the threshold for the derivative, while setting the other area therein to the second value, so as to generate the binary second derivative image.

The binary second derivative image generation unit can be designed such that it performs Laplacian filtering on the detection target image or the smoothed image to calculate the second derivatives of the detection target image or of the smoothed image, and binarizes, with the threshold for the derivative, the second derivatives thus calculated by performing Laplacian filtering, so as to generate the binary second derivative image.

The binary second derivative image generation unit can be designed such that it calculates horizontal second derivatives and vertical second derivatives of the detection target image or of the smoothed image, and sets an area therein to the first value where both its horizontal second derivatives and its vertical second derivatives are lower than the threshold for the derivative, or where both are equal to or lower than the threshold for the derivative, while setting the other area therein to the second value, so as to generate the binary second derivative image.

The binary second derivative image generation unit can be designed such that it calculates horizontal second derivatives and vertical second derivatives of the detection target image or of the smoothed image, and sets an area therein to the first value where both its horizontal second derivatives and its vertical second derivatives are higher than the threshold for the derivative, or where both are equal to or higher than the threshold for the derivative, while setting the other area therein to the second value, so as to generate the binary second derivative image.

The binary second derivative generation unit can be designed such that it uses different values as the threshold for the derivative, depending on the area in the detection target image or the smoothed image, and lowers the threshold for the derivative from 0 to a negative value for an area in the detection target image or the smoothed image corresponding to an area therein where the value of the binary difference image is the first value and to its neighboring area, and raises the threshold for the derivative from 0 to a positive value for the other area.

The binary second derivative generation unit can be designed such that it uses different values as the threshold for the derivative, depending on the area in the detection target image or the smoothed image, raises the threshold for the derivative from 0 to a positive value for an area in the detection target image or the smoothed image corresponding to an area therein where the value of the binary difference image is the first value and to its neighboring area, and lowers the threshold for the derivative from 0 to a negative value for the other area.

The binary second derivative image generation unit can be designed such that it sets an area in the binary difference image as a high-temperature area where its value is the first value, and calculates a major axis direction of the high-temperature area, calculates second derivatives of the detection target image or the smoothed image in the major axis direction, and binarizes the second derivatives with the threshold for the derivative, so as to generate the binary second derivative image.

The binary second derivative image generation unit can be designed such that if a plurality of the high-temperature areas are separately present, it calculates a major axis direction of each of the high-temperature areas, and calculates second derivatives of the each high-temperature area in the major axis direction for an area, corresponding to the each high-temperature area, in the detection target image or the smoothed image, and binarizes the second derivatives with the threshold for the derivative, so as to generate the binary second derivative image.

An object detection method according to another aspect of the present invention is an object detection method comprising: a step of generating a background image based on an output of a temperature distribution sensor to detect a temperature distribution in a detection area, wherein the background image is an image showing the temperature distribution in the detection area and which is an image as a reference for the absence of a detection target object in the detection area; a step of generating a detection target image based on the output of the temperature distribution sensor, wherein the detection target image is an image showing a temperature distribution in the detection area and which is an image as a detection target to detect the detection target object in the detection area; a step of generating a binary difference image by binarizing a difference value between the background image and the detection target image with a predetermined threshold for the difference value; a step of generating a binary second derivative image by binarizing second derivatives of the detection target image or of a smoothed image, obtained by smoothing the detection target image, with a predetermined threshold for the derivative; and a step of detecting the detection target object based on a logical product of the binary difference image and the binary second derivative image.

The object detection method can be designed such that it is a method of detecting the detection target object having a higher temperature than background temperature in the detection area, wherein the step of generating the binary difference value is a step of setting an area to a first value where the difference value obtained by subtracting the background image from the detection target image is equal to or higher than the threshold for the difference value, and further setting an area to a second value where the difference value obtained by subtracting the background image from the detection target image is lower than the threshold for the difference value, so as to generate the binary difference image, and wherein the step of generating the binary second derivative image is a step of setting the threshold for the derivative to 0, and setting an area in the detection target image or the smoothed image to the first value where its second derivatives are lower than the threshold for the derivative, or where its second derivatives are equal to or lower than the threshold for the derivative, while setting the other area therein to the second value, so as to generate the binary second derivative image.

The object detection method can be designed such that it is a method of detecting the detection target object having a lower temperature than background temperature in the detection area, wherein the step of generating the binary difference image is a step of setting an area to a first value where the difference value obtained by subtracting the detection target image from the background image is equal to or higher than the threshold for the difference value, and further setting an area to a second value where the difference value obtained by subtracting the detection target image from the background image is lower than the threshold for the difference value, so as to generate the binary difference image, and wherein the step of generating the binary second derivative image is a step of setting the threshold for the derivative to 0, and setting an area in the detection target image or the smoothed image to the first value where its second derivatives are higher than the threshold for the derivative, or where its second derivatives are equal to or higher than the threshold for the derivative, while setting the other area therein to the second value, so as to generate the binary second derivative image.

The step of generating the binary second derivative image can be designed such that it includes: a step of performing Laplacian filtering on the detection target image or the smoothed image to calculate the second derivatives of the detection target image or of the smoothed image; and a step of binarizing, with the threshold for the derivative, the second derivatives thus calculated by performing Laplacian filtering.

The step of generating the binary second derivative image can be designed such that it includes: a step of calculating horizontal second derivatives and vertical second derivatives of the detection target image or of the smoothed image; and a step of setting an area therein to the first value where both its horizontal second derivatives and its vertical second derivatives are lower than the threshold for the derivative, or where both are equal to or lower than the threshold for the derivative, while setting the other area therein to the second value.

The step of generating the binary second derivative image can be designed such that it includes: a step of calculating horizontal second derivatives and vertical second derivatives of the detection target image or of the smoothed image; and a step of setting an area therein to the first value where both its horizontal second derivatives and its vertical second derivatives are higher than the threshold for the derivative, or where both are equal to or higher than the threshold for the derivative, while setting the other area therein to the second value.

The threshold for the derivative for an area in the detection target image or the smoothed image, corresponding to an area therein where the value of the binary difference image is the first image and to its neighboring area, can be lower than the threshold for the derivative for the other area.

The threshold for the derivative for an area in the detection target image or the smoothed image, corresponding to an area therein where the value of the binary difference image is the first image and to its neighboring area, can be higher than the threshold for the derivative for the other area.

The step of generating the binary second derivative image can be designed such that it includes: a step of setting an area in the binary difference image as a high-temperature area where its value is the first value, and calculating a major axis direction of the high-temperature area; a step of calculating second derivatives of the detection target image or the smoothed image in the major axis direction; and a step of binarizing the second derivatives, as calculated, with the threshold for the derivative.

If a plurality of the high-temperature areas are separately present, the step of calculating the major axis direction can be a step of calculating a major axis direction of each of the high-temperature areas, while the step of calculating the second derivatives can be a step of calculating second derivatives of the each high-temperature area in the major axis for an area, corresponding to the each high-temperature area, in the detection target image or the smoothed image.

Effect of the Invention

According to the present invention, a detection target object is detected based on a logical product of a binary difference image and a binary second derivative image, so that even if multiple detection target objects are present in a detection area, the respective detection target objects can be separately detected.

BRIEF DESCRIPTION OF THE DRAWING(S)

FIG. 9 is a view showing an example of horizontal second derivative filter coefficients used in the object detection of the object detection device.

FIG. 10 is a view showing an example of vertical second derivative filter coefficients used in the object detection of the object detection device.

FIG. 11A and FIG. 11B are views showing another example of horizontal second derivative filter coefficients used in the object detection of the object detection device.

FIG. 12A and FIG. 12B are views showing another example of vertical second derivative filter coefficients used in the object detection of the object detection device.

FIG. 15A is a view showing an example of high-temperature areas in a smoothed image processed in an object detection of an object detection device according to a fifth embodiment of the present invention, while

DETAILED DESCRIPTION

Hereinafter, object detection devices and object detection methods according to embodiments of the present invention will be described with reference to the drawings.

[First Embodiment]

Figure 1:
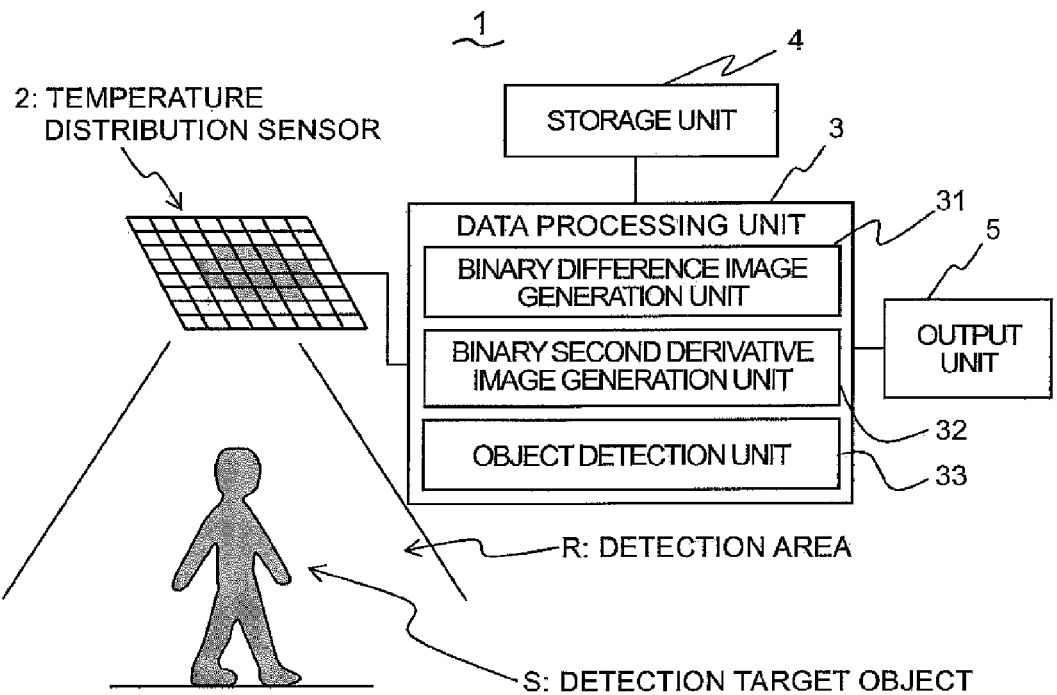
FIG. 1 is an electrical block diagram showing the structure of an object detection device according to a first embodiment of the present invention.

First, an object detection device and an object detection method according to a first embodiment will be described. FIG. 1 shows a structure of the object detection device according to the first embodiment. The object detection device 1 is a device to detect an object by using background subtraction. More specifically, the object detection device 1 is a device to detect a detection target object based on a difference between: a background image, which is an image showing a temperature distribution in a detection area R and which is an image as a reference for the absence of the detection target object; and a detection target image which is an image showing a temperature distribution in the detection area R and which is an image as a detection target to detect the detection target object. The object detection device 1 detects a hot body as the detection target object. Further, the object detection device 1 assumes that the detection target object has a higher temperature than background temperature in the detection area to detect a detection target object having a higher temperature than the background in the detection area.

The object detection device 1 comprises a temperature distribution sensor 2 for detecting a temperature distribution in the detection area R, a data processing unit 3 for performing various processing, a storage unit 4 for storing various information, and an output unit 5 for outputting various information.

The temperature distribution sensor 2 detects infrared radiation emitted from the detection area R to detect a temperature distribution in the detection area R, and outputs the detection result. The data processing unit 3 performs various processing based on the output of the temperature distribution sensor 2 to detect a detection target object S in the detection area R. The storage unit 4 stores various information generated by various processing of the data processing unit 3. Via wireless or wired communication, the output unit 5 transmits the detection result of the detection target object S (information such as the number and position of the detection target object S) obtained by the data processing unit 3 to external devices. The data processing unit 3 comprises a binary difference image generation unit 31, a binary second derivative image generation unit 32 and an object detection unit 33. The binary difference image generation unit 31 generates a binary difference image by binarizing a difference value between the background image and the detection target image with a predetermined threshold for the difference value. The binary second derivative image generation unit 32 generates a binary second derivative image by binarizing second derivatives of the detection target image or of a smoothed image, obtained by smoothing the detection target image, with a predetermined threshold for the derivative. The object detection unit 33 detects the detection target object S based on a logical product of the binary difference image and the binary second derivative image.

Here, the temperature distribution sensor 2 and the output of the temperature distribution sensor 2 will be described. The temperature distribution sensor 2 comprises a plurality of infrared detection elements arranged two-dimensionally, and detects infrared radiation emitted from the detection area R, using the plurality of infrared detection elements, to detect a temperature distribution in the detection area R. More specifically, the temperature distribution sensor 2 detects the detection area R two-dimensionally, and detects the temperature of each position in the two-dimensionally detected detection area R, and thus detects the temperature distribution in the detection area R two-dimensionally. Then, the temperature distribution sensor 2 outputs the temperature of each position in the two-dimensionally detected detection area R, and thus outputs, as a detection temperature image, the temperature distribution in the two-dimensionally detected detection area R.

Assuming that $p(i,j)$ ($i=1, 2, \ldots, u; j=1, 2, \ldots, v$) is each of areas obtained by dividing the two-dimensionally detected detection area R into u rows×v columns (8 rows×8 columns ($u=8$, $v=8$) according to the present embodiment), the temperature distribution sensor 2 detects the temperature of each area (each position) $p(i,j)$. Then, assuming that $A(i,j)$ is the detected temperature of each area $p(i,j)$, the temperature distribution sensor 2 outputs a detection temperature image $A(x, y)$ where $A(x,y)$ is the total of $A(i,j)$ ($i=1, 2, \ldots, u; j=1, 2, \ldots, v$). More specifically, $A(x,y)$ is the total of $A(\mathbf{1,1})$, $A(\mathbf{1,2}), \ldots, A(\mathbf{1},v), A(\mathbf{2,1}), A(\mathbf{2,2}), \ldots, A(\mathbf{2},v), \ldots, A(u,\mathbf{1})$, $A(u,\mathbf{2}), \ldots$, and $A(u,v)$. The value (temperature) of $A(x,y)$ at $x=i$, $y=j$ is $A(i,j)$.

Figure 2:
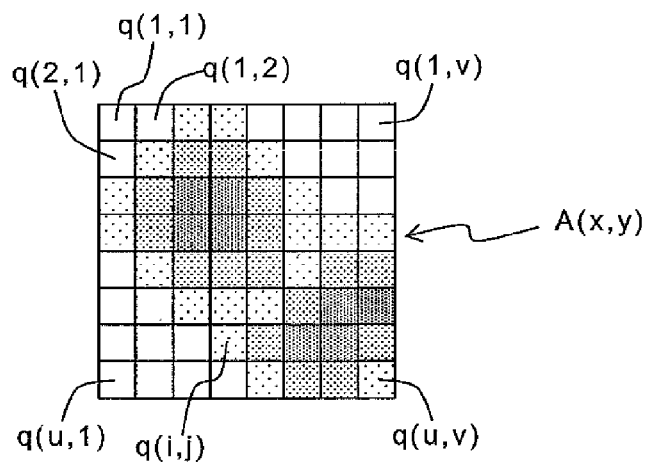
FIG. 2 is a view for explaining a detection temperature image as an output of a temperature distribution sensor of the object detection device.

The detection temperature image $A(x,y)$ can be understood as shown in FIG. 2. More specifically, it can be understood that the detection temperature image $A(x,y)$ is composed of pixels $q(i,j)$ ($i=1, 2, \ldots, u; j=1, 2, \ldots, v$) in u rows×v columns, and is such an image that $A(i,j)$, which is the value of $A(x,y)$ at $x=i$, $y=j$, is the value of the pixel $q(i,j)$. In FIG. 2, the magnitude of the value $A(i,j)$ of the pixel $q(i,j)$ is shown by the brightness/darkness of the pixel $q(i,j)$. The pixel $q(i,j)$ of the detection temperature image $A(x,y)$ corresponds to the area $p(i,j)$ in the detection area R, while the value $A(i,j)$ of the pixel $q(i,j)$ of the detection temperature image $A(x,y)$ is the detection temperature of the area $p(i,j)$ in the detection area R by the temperature distribution sensor 2.

The temperature distribution sensor 2 detects a temperature distribution in the detection area R at predetermined time intervals (for example, every 0.1 second) so as to output a detection temperature image $A(x,y)$. More specifically, assuming that $A[t](x,y)$ is a detection temperature image $A(x, y)$ at detection time point t, the temperature distribution sensor 2 outputs detection temperature images $A[t](x,y)$ ($t=t_1, t_2, t_3, \ldots$). Here, $t_1, t_2, t_3, \ldots$ are detection time points at predetermined time intervals. Thus, as time passes, the temperature distribution sensor 2 sequentially outputs a detection temperature image $A[t_1](x,y)$, a detection temperature image $A[t_2](x,y)$, a detection temperature image $A[t_3](x,y), \ldots$ at predetermined time intervals.

Figure 3:
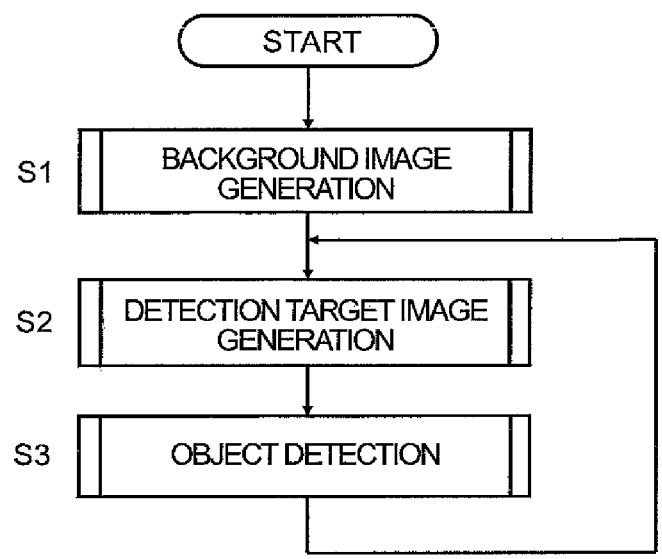
FIG. 3 is a flow chart showing an operation of the object detection device.

FIG. 3 shows a flow chart of the operation of the data processing unit 3 of the object detection device 1. The data processing unit 3 (the object detection device 1) operates as follows to detect a detection target object S in the detection area R.

When power of the object detection device 1 is turned on, the data processing unit 3 first performs background image generation to generate a background image $B(x,y)$ (S1). The background image $B(x,y)$ is an image showing a temperature distribution in the detection area R, and is an image as a reference for the absence of the detection target object S in the detection area R. In the background image generation, the data processing unit 3 generates the background image $B(x,y)$ based on the detection temperature image $A(x,y)$ which is an output of the temperature distribution sensor 2. Like the detection temperature image $A(x,y)$, the background image $B(x,y)$ is composed of pixels $q(i,j)$ in u rows×v columns, and is such an image that $B(i,j)$, which is the value of $B(x,y)$ at $x=i$, $y=j$, is the value of the pixel $q(i,j)$. The pixel $q(i,j)$ of the background image $B(x,y)$ corresponds to an area $p(i,j)$ in the detection area R, while the value $B(i,j)$ of the pixel $q(i,j)$ of the background image $B(x,y)$ represents background temperature (temperature as a reference for the absence of the detection target object S) in the area $p(i,j)$ in the detection area R. The data processing unit 3 generates the background image $B(x,y)$ by determining, as the background image $B(x,y)$, the detection temperature image $A(x,y)$ which is an output of the temperature distribution sensor 2 at an arbitrary time point, with the detection target object S being excluded (i.e. in the absence of the detection target object S). The data processing unit 3 stores, in the storage unit 4, the background image B(x,y) generated by the background image generation.

Subsequently, the data processing unit 3 first performs detection target image generation to generate a detection target image F(x,y) (S2). The detection target image F(x,y) is an image showing a temperature distribution in the detection area R, and is an image as a detection target (to be compared with the background image B(x,y)) to detect the detection target object S in the detection area R. In the detection target image generation, the data processing unit 3 generates the detection target image F(x,y) based on the detection temperature image A(x,y) which is an output of the temperature distribution sensor 2. Like the detection temperature image A(x,y), the detection target image F(x,y) is composed of pixels q(i,j) in u rows×v columns, and is such an image that F(i,j), which is the value of F(x,y) at x=i, y=j, is the value of the pixel q(i,j). The pixel q(i,j) of the detection target image F(x,y) corresponds to the area p(i,j) in the detection area R, while the value F(i,j) of the pixel q(i,j) of the detection target image F(x,y) represents temperature of the area p(i,j) in the detection area R. The data processing unit 3 generates the detection target image F(x,y) by determining, as the detection target image F(x,y), the detection temperature image A(x,y) which is an output of the temperature distribution sensor 2 at an arbitrary time point (time point at which to perform detection).

Subsequently, the data processing unit 3 performs object detection to detect the detection target object S in the detection area R (S3). In the object detection, the data processing unit 3 detects the detection target object S based on a difference between the background image B(x,y) and the detection target image F(x,y). The method of detecting the detection target object S in the object detection will be described in detail later. The data processing unit 3 transmits, to the output unit 5, the detection result of the detection target object S by the object detection. Thus, the output unit 5 outputs the detection result of the detection target object S.

After the object detection, the data processing unit 3 repeats the process from the above-described S2 onward. The processes S2 and S3 are repeated at a predetermined period (for example, at a period of 0.1 second). The detection target object S in the detection area R can be constantly detected by repeating the processes S2 and S3 at a predetermined period.

Thus, the data processing unit 3 (the object detection device 1) performs the background image generation, the detection target image generation and the object detection to detect the detection target object S in the detection area R. More specifically, it generates the background image B(x,y) and also generates the detection target image F(x,y) based on the output of the temperature distribution sensor 2, and further uses a difference between the background image B(x,y) and the detection target image F(x,y) to detect the detection target object S having a higher temperature than the background temperature in the detection area R.

Here, a method for detecting the detection target object S in the above-described object detection will be briefly described. First, the data processing unit 3 (its binary difference image generation unit 31) generates a binary difference image C(x,y) by binarizing a difference value between the background image B(x,y) and the detection target image F(x,y) with a predetermined threshold for the difference value. In other words, with the predetermine threshold for the difference value, the data processing unit 3 generates the binary difference image C(x,y) by binarizing the difference value obtained by subtracting the background image B(x,y) from the detection target image F(x,y). More specifically, the data processing unit 3 sets an area to 1 (first value) where the difference value obtained by subtracting the background image B(x,y) from the detection target image F(x,y) is equal to or higher than the threshold for the difference value, and further sets an area to 0 (second value) where the difference value obtained by subtracting the background image B(x,y) from the detection target image F(x,y) is lower than the threshold for the difference value, so as to generate the binary difference image C(x,y).

Further, the data processing unit 3 (its binary second derivative image generation unit 32) binarizes second derivatives of a smoothed image F'(x,y), obtained by smoothing the detection target image F(x,y), with a predetermined threshold for the derivative, so as to generate a binary second derivative image D(x,y). More specifically, it sets the threshold for the derivative to 0, and sets an area in the smoothed image F'(x,y) to 1 (first value) where its second derivatives are negative (i.e. lower than the threshold for the derivative), while setting the other area in the smoothed image F'(x,y) (i.e. its area where its second derivatives are either positive or 0) to 0 (second value), so as to generate the binary second derivative image D(x,y).

Further, the data processing unit 3 makes an overall determination based on the binary difference image C(x,y) and the binary second derivative image D(x,y) to detect the detection target object S. More specifically, the data processing unit 3 (its object detection unit 33) detects the detection target object S based on a logical product of the binary difference image C(x,y) and the binary second derivative image D(x,y).

An area in the binary difference image C(x,y) where its value is 1 (i.e. area where the difference value obtained by subtracting the background image B(x,y) from the detection target image F(x,y) is equal to or higher than the threshold for the difference value) is an area where there is a possibility that the detection target object S is present. Further, an area in the binary difference image C(x,y) where its value is 0 (i.e. area where the difference value obtained by subtracting the background image B(x,y) from the detection target image F(x,y) is lower than the threshold for the difference value) is an area where there is no possibility that the detection target object S is present.

On the other hand, considering second derivatives of a temperature distribution, the second derivatives of the temperature distribution are negative in an area where the temperature increasing rate decreases and an area where the temperature decreasing rate increases, while the second derivatives of the temperature distribution are positive in an area where the temperature increasing rate increases and an area where the temperature decreasing rate decreases. If an area having a higher temperature than ambient is present, it is possible that such area may include an area where the temperature increasing rate decreases and an area where the temperature decreasing rate increases, which, in other words, are areas where the second derivatives of the temperature distribution are negative. Further, if an area with a temperature lower than ambient is present, it is possible that such area may include an area where the temperature increasing rate increases and an area where the temperature decreasing rate decreases, which, in other words, are areas where the second derivatives of the temperature distribution are positive.

The detection target image F(x,y) is an image showing a temperature distribution in the detection area R, while the smoothed image F'(x,y) obtained by smoothing the detection target image F(x,y) is also an image showing a temperature distribution in the detection area R. Thus, an area in the binary second derivative image D(x,y) where its value is 1 (i.e. area in the smoothed image F'(x,y) where its second derivatives are negative) corresponds to an area in the detection area R where its second derivatives of the temperature distribution are negative. In other words, the area in the binary second derivative image D(x,y) where its value is 1 corresponds to an area in the detection area R having a higher temperature than ambient. Further, an area in the binary second derivative image D(x,y) where its value is 0 (i.e. area in the smoothed image F'(x,y) where its second derivatives are either positive or 0) corresponds to an area in the detection area R where its second derivatives of the temperature distribution are either positive or 0. In other words, the area in the binary second derivative image D(x,y) where its value is 0 corresponds to an area in the detection area R with a temperature lower than ambient. The object detection device 1 assumes that the detection target object S has a higher temperature than background temperature (ambient temperature).

Thus, an area in the binary second derivative image D(x,y) where its value is 1 (i.e. area in the smoothed image F'(x,y) where its second derivatives are negative) is an area where there is a possibility that the detection target object S is present. Further, an area in the binary second derivative image D(x,y) where its value is 0 (i.e. area in the binary second derivative image D(x,y) where the second derivatives of the smoothed image F'(x,y) are either positive or 0) is an area where there is no possibility that the detection target object S is present.

These means that an area in the binary second derivative image D(x,y) where its value is 0, even if it is an area in the binary difference image C(x,y) where its value is 1, is an area where there is no possibility that the detection target object S is present. Further, an area in the binary difference image C(x,y) where its value is 0, even if it is an area in the binary second derivative image D(x,y) where its value is 1, is an area where there is no possibility that the detection target object S is present.

Thus, based on a logical product of the binary difference image C(x,y) and the binary second derivative image D(x,y), the data processing unit 3 determines that the detection target object S is present in an area where the value of the logical product of the binary difference image C(x,y) and the binary second derivative image D(x,y) is 1 (first value). Further, if a plurality of areas, where the value of the logical product is 1, are separately present, the data processing unit 3 determines that separate detection target objects S are respectively present in the separately present areas where the value of the logical product is 1.

Figure 4:
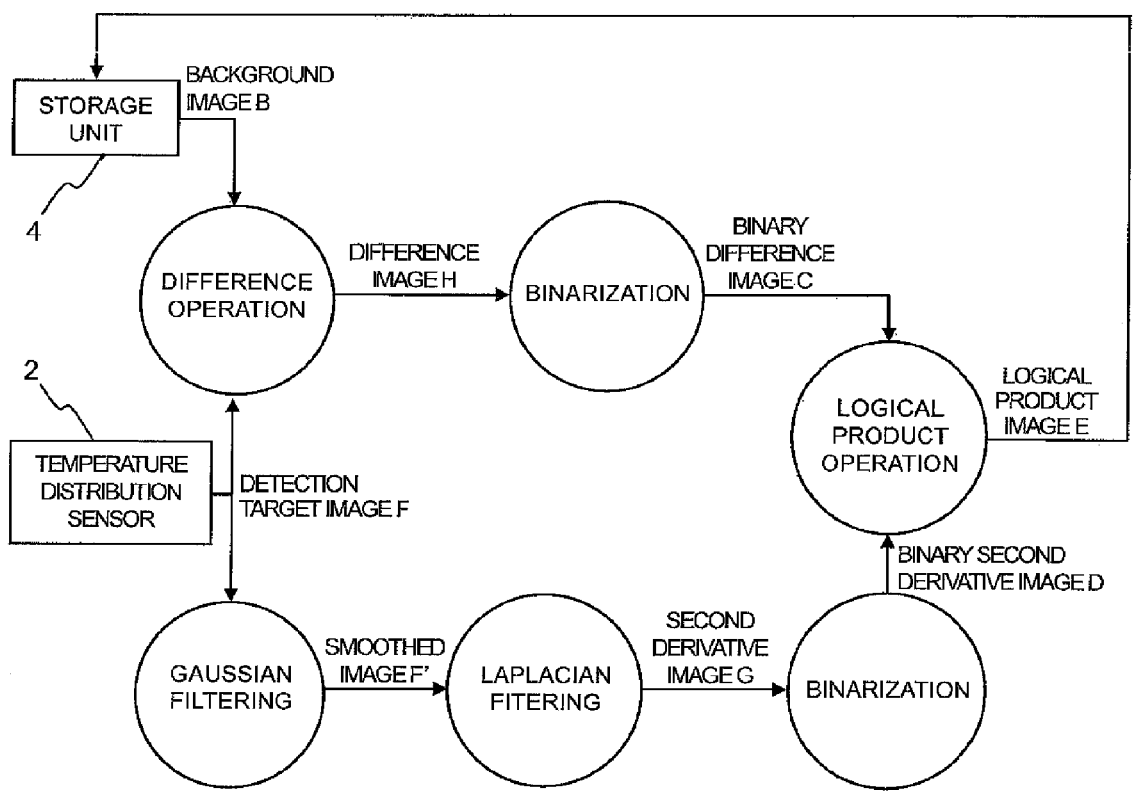
FIG. 4 is a view showing a process flow in an object detection of the object detection device.
Figure 5:
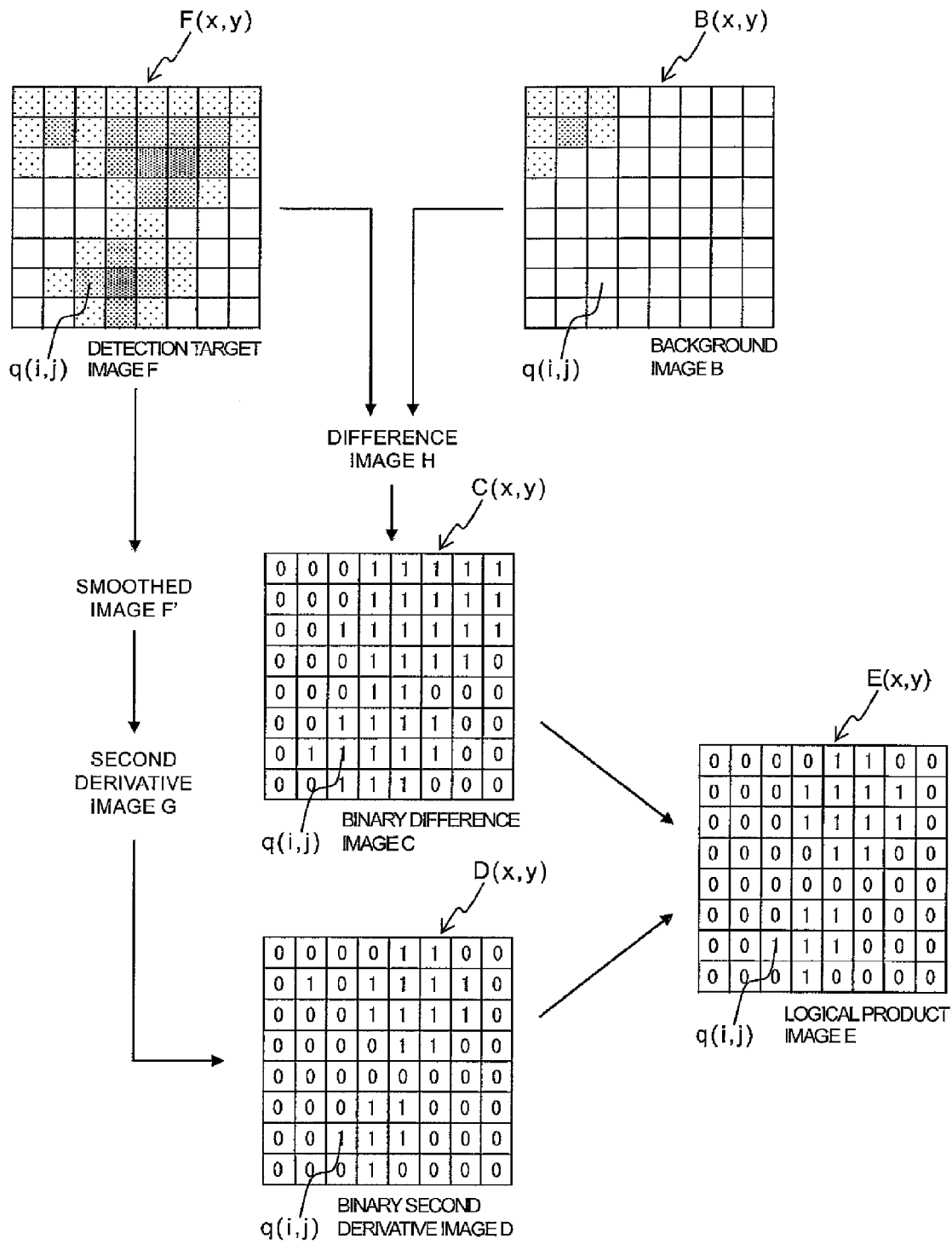
FIG. 5 is a view showing examples of various images processed in the object detection of the object detection device.

FIG. 4 shows a process flow in the object detection described above. FIG. 5 shows examples of a background image B (x,y) and a detection target image F(x,y) on which the object detection is based, and of a binary difference image C(x,y), a binary second derivative image D(x,y) and a logical product image E(x,y) which are generated in the object detection.

In the object detection, the data processing unit 3 detects a detection target object S based on the detection target image F(x,y) and the background image B(x,y).

The detection target image F(x,y) (detection temperature image A in the present embodiment) is, for example, an image such as shown in FIG. 5. The detection target image F(x,y) is composed of pixels q(i,j) in u rows×v columns, and is such an image that F(i,j), which is the value of F(x,y) at x=i, y=j, is the value of the pixel q(i,j). In the detection target image F(x,y) shown in FIG. 5, the magnitude of the value F(i,j) of the pixel q(i,j) is shown by the brightness/darkness of the pixel q(i,j). The pixel q(i,j) of the detection target image F(x,y) corresponds to the area p(i,j) in the detection area R, while the value F(i,j) of the pixel q(i,j) of the detection target image F(x,y) represents temperature of the area p(i,j) in the detection area R.

Further, the background image B(x,y) is, for example, an image such as shown in FIG. 5. The background image B(x,y) is composed of pixels q(i,j) in u rows×v columns, and is such an image that B(i,j), which is the value of B(x,y) at x=i, y=j, is the value of the pixel q(i,j). In the background image B(x,y) shown in FIG. 5, the magnitude of the value B(i,j) of the pixel q(i,j) is shown by the brightness/darkness of the pixel q(i,j). The pixel q(i,j) of the background image B(x,y) corresponds to the area p(i,j) in the detection area R, while the value B(i,j) of the pixel q(i,j) of the background image B(x,y) represents background temperature in the area p(i,j) in the detection area R.

First, the data processing unit 3 performs subtraction to subtract the background image B(x,y) from the detection target image F(x,y) to generate a difference image H(x,y). More specifically, the data processing unit 3 generates the difference image H(x,y) by determining, as H(i,j), a difference value obtained by subtracting B(i,j) from F(i,j) for each i and j of i=1, 2, . . . , u; j=1, 2, . . . , v. The value of H(x,y) at x=i, y=j is H(i,j).

Then, the data processing unit 3 binarizes the difference image H(x,y) to generate a binary difference image C(x,y). More specifically, the data processing unit 3 generates the binary difference image C(x,y) by determining, as C(i,j), a value obtained by binarizing H(i,j) for each i and j of i=1, 2, . . . , u; j=1, 2, . . . , v with a predetermined threshold for the difference value. Even more specifically, the data processing unit 3 (its binary difference image generation unit 31) sets an area to 1 (first value) where H(i,j) is equal to or higher than the threshold for the difference value, and further sets an area to 0 (second value) where H(i,j) is lower than the threshold for the difference value, so as to generate the binary difference image C(x,y). In other words, the data processing unit 3 sets C(i,j) to 1 (first value) if H(i,j) is equal to higher than the threshold for the difference value, and further sets C(i,j) to 0 (second value) if H(i,j) is lower than the threshold for the difference value, so as to generate the binary difference image C(x,y). The value of C(x,y) at x=i, y=j is C(i,j).

The binary difference image C(x,y) is such as shown in FIG. 5. The binary difference image C(x,y) is composed of pixels q(i,j) in u rows×v columns, and is such an image that C(i,j), which is the value of C(x,y) at x=i, y=j, is the value of the pixel q(i,j). In the binary difference image C(x,y) shown in FIG. 5, the value "0" or "1" denoted in each pixel q(i,j) represents the value C(i,j) of the pixel q(i,j).

Further, the data processing unit 3 performs Gaussian filtering, which is a kind of smoothing process, on the detection target image F(x,y), to generate a smoothed image F'(x,y). More specifically, the data processing unit 3 performs Gaussian filtering on the detection target image F(x,y) to calculate a smoothed value of the detection target image F(x,y) at x=i, y=j for each i and j of i=1, 2, . . . , u; j=1, 2, . . . , v. The smoothed value of the detection target image F(x,y) at x=i, y=j is calculated using Gaussian filtering, with predetermined Gaussian filter coefficients, based on the values of a pixel of the detection target image F(x,y) at x=i, y=j and its surrounding pixels. Then, the data processing unit 3 generates the smoothed image F'(x,y) by determining, as F'(i,j), a smoothed value of the detection target image F(x,y) at x=i, y=j for each i and j. The value of F'(x,y) at x=i, y=j is F'(i,j). The smoothed image F'(x,y) is an image showing a temperature distribution in the detection area R.

The smoothed image F'(x,y) is composed of pixels q(i,j) in u rows×v columns, and is such an image that F'(i,j), which is the value of F'(x,y) at x=i, y=j, is the value of the pixel q(i,j). The pixel q(i,j) of the smoothed image F'(x,y) corresponds to the area p(i,j) in the detection area R, and the value F'(i,j) of the pixel q(i,j) of the smoothed image F'(x,y) represents temperature of the area p(i,j) in the detection area R.

Subsequently, the data processing unit 3 (its binary second derivative image generation unit 32) performs Laplacian filtering on the smoothed image F'(x,y) to generate a second derivative image G(x,y). More specifically, the data processing unit 3 performs Laplacian filtering on the smoothed image F'(x,y) to calculate a second derivative of the smoothed image F'(x,y) at x=i, y=j for each i and j of i=1, 2, ..., u; j=1, 2, ..., v. The second derivative of the smoothed image F'(x,y) at x=i, y=j is calculated using Laplacian filtering, with predetermined Laplacian filter coefficients, based on the values of a pixel of the smoothed image F'(x,y) at x=i, y=j and its surrounding pixels. The data processing unit 3 generates the second derivative image G(x,y) by determining, as G(i,j), a second derivative of the smoothed image F'(x,y) at x=i, y=j for each i and j. The value of G(x,y) at x=i, y=j is G(i,j). The second derivative image G(x,y) is an image showing second derivatives of a temperature distribution in the detection area R (i.e. degree of increase/decrease in the rate of temperature change in the detection area R).

Figure 6:
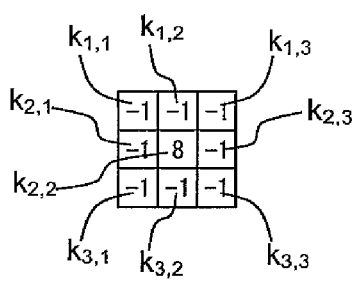
FIG. 6 is a view showing an example of Laplacian filter coefficients used in the object detection of the object detection device.

In the generation of the second derivative image G(x,y), the data processing unit 3 performs Laplacian filtering, using, for example, Laplacian filter coefficients $k_{1,1}, k_{1,2}, k_{1,3}, k_{2,1}, k_{2,2}, k_{2,3}, k_{3,1}, k_{3,2}$ and $k_{3,3}$ in 3 rows and 3 columns shown in FIG. 6, to calculate G(i,j): G(i,j)=−1×($k_{1,1}$×F'(i−1,j−1)+$k_{1,2}$×F'(i−1,j)+$k_{1,3}$×F'(i−1,j+1)+$k_{2,1}$×F'(i,j−1)+$k_{2,2}$×F'(i,j)+$k_{2,3}$×F'(i,j+1)+$k_{3,1}$×F'(i+1,j−1)+$k_{3,2}$×F'(i+1,j)+$k_{3,3}$×F'(i+1,j+1)). In the example shown in FIG. 6, $k_{1,1}$=−1, $k_{1,2}$=−1, $k_{1,3}$=−1, $k_{2,1}$=−1, $k_{2,2}$=8, $k_{2,3}$=−1, $k_{3,1}$=−1, $k_{3,2}$=−1, and $k_{3,3}$=−1.

Figure 7:
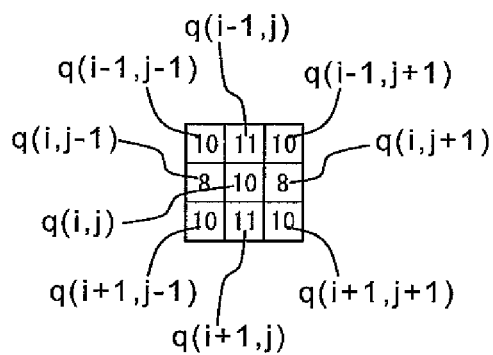
FIG. 7 is a view showing an example of a partial area of a smoothed image processed in the object detection of the object detection device.

Assume that an area of 3 rows and 3 columns in the smoothed image F'(x,y) has values (i.e. values of a pixel of the smoothed image F'(x,y) at x=i, y=j and its surrounding pixels) which are, for example, the values shown in FIG. 7. More specifically, assume that F'(i−1,j−1)=10, F'(i−1,j)=11, F'(i−1,j+1)=10, F'(i,j−1)=8, F'(i,j)=10, F'(i,j+1)=8, F'(i+1,j−1)=10, F'(i+1,j)=11, and F'(i+1,j+1)=10. In this case, the second derivative G(i,j) of the smoothed image F'(x,y) at x=i, y=j as calculated using the Laplacian filter coefficients shown in FIG. 6 is G(i,j)=−2.

The second derivative image G(x,y) is composed of pixels q(i,j) in u rows×v columns, and is such an image that G(i,j), which is the value of G(x,y) at x=i, y=j, is the value of the pixel q(i,j). The pixel q(i,j) of the second derivative image G(x,y) corresponds to the area p(i,j) in the detection area R. The value G(i,j) of the pixel q(i,j) of the second derivative image G(x,y) represents a second derivative of the temperature distribution in the area p(i,j) in the detection area R, which corresponds to the pixel q(i,j). In other words, the value G(i,j) of the pixel q(i,j) of the second derivative image G(x,y) represents the degree of increase/decrease in the rate of temperature change of the area p(i,j), relative to its surrounding area, in the detection area R, in which the area p(i,j) corresponds to the pixel q(i,j).

Then, the data processing unit 3 (its binary second derivative image generation unit 32) binarizes the second derivative image G(x,y) to generate a binary second derivative image D(x,y). More specifically, the data processing unit 3 generates the binary second derivative image D(x,y) by determining, as D(i,j), a value obtained by binarizing G(i,j) for each i and j of i=1, 2, ..., u; j=1, 2, ..., v with a predetermined threshold for the derivative. Even more specifically, the data processing unit 3 (its binary second derivative image generation unit 32) sets an area to 1 (first value) where G(i,j) is lower than the threshold for the derivative, and further sets an area to 0 (second value) where G(i,j) is equal to or higher than the threshold for the derivative, so as to generate the binary second derivative image D(x,y). In other words, the data processing unit 3 sets the threshold for the derivative to 0, and sets D(i,j) to 1 if G(i,j) is negative, and further sets D(i,j) to 0 if G(i,j) is not negative (or is either positive or 0), so as to generate the binary second derivative image D(x,y). The value of D(x,y) at x=i, y=j is D(i,j).

The binary second derivative image D(x,y) is an image showing binarized second derivatives of a temperature distribution in the detection area R (i.e. degree of increase/decrease in the rate of temperature change in the detection area R). More specifically, the binary second derivative image D(x,y) is an image showing the detection area R as divided into an area where the second derivatives of the temperature distribution in the detection area R are negative, and an area where the second derivatives of the temperature distribution in the detection area R are not negative (or are either positive or 0). The area where the second derivatives of the temperature distribution are negative is an area where the rate of temperature increase decreases and an area where the rate of temperature decrease increases, while the area where the second derivatives of the temperature distribution are positive is an area where the rate of temperature increase increases and an area where the rate of temperature decrease decreases.

The binary second derivative image D(x,y) is such as shown in FIG. 5. The binary second derivative image D(x,y) is composed of pixels q(i,j) in u rows×v columns, and is such an image that D(i,j), which is the value of D(x,y) at x=i, y=j, is the value of the pixel q(i,j). In the binary second derivative image D(x,y) shown in FIG. 5, the value "0" or "1" denoted in each pixel q(i,j) represents the value D(i,j) of the pixel q(i,j). The pixel q(i,j) of the binary second derivative image D(x,y) corresponds to the area p(i,j) in the detection area R.

The value D(i,j) of the pixel q(i,j) of the binary second derivative image D(x,y) indicates whether or not the second derivative of the temperature distribution in the area p(i,j) in the detection area R, which corresponds to the pixel q(i,j), is negative. More specifically, the value D(i,j) of 1 of the pixel q(i,j) indicates that the second derivative of the temperature distribution in the area p(i,j) in the detection area R, which corresponds to the pixel q(i,j), is negative. Further, the value D(i,j) of 0 of the pixel q(i,j) indicates that the second derivative of the temperature distribution in the area p(i,j) in the detection area R, which corresponds to the pixel q(i,j), is not negative (or is either positive or 0).

Then, the data processing unit 3 (its object detection unit 33) performs logical product operation to generate a logical product image E(x,y) of the binary difference image C(x,y) and the binary second derivative image D(x,y). More specifically, the data processing unit 3 generates the logical product image E(x,y) by determining, as E(i,j), a value of the logical product of C(i,j) and D(i,j) for each i and j of i=1, 2, ..., u; j=1, 2, ..., v. Even more specifically, the data processing unit 3 sets E(i,j) to 1 if the value of the logical product of C(i,j) and D(i,j) is 1, and further sets E(i,j) to 0 if the value of the logical product of C(i,j) and D(i,j) is 0, so as to generate the logical product image E(x,y). The value of E(x,y) at x=i, y=j is E(i,j).

The logical product image E(x,y) is such as shown in FIG. 5. The logical product image E(x,y) is composed of pixels q(i,j) in u rows×v columns, and is such an image that E(i,j), which is the value of E(x,y) at x=i, y=j, is the value of the pixel q(i,j). In the logical product image E(x,y) shown in FIG. 5, the value "0" or "1" denoted in each pixel q(i,j) represents the value E(i,j) of the pixel q(i,j). The pixel q(i,j) of the logical product image E(x,y) corresponds to the area p(i,j) in the detection area R.

Then, based on the logical product image E(x,y), i.e. based on a logical product of the binary difference image C(x,y) and the binary second derivative image D(x,y), the data processing unit 3 (its object detection unit 33) detects a detection target object(s) S. More specifically, the data processing unit 3 determines that a detection target object S is present in an area in the logical product image E(x,y) where its value E(i,j) is 1. Further, if a plurality of areas are separately present in the logical product image E(x,y) where its value E(i,j) is 1, the data processing unit 3 determines that separate detection target objects S are respectively present in the separately present areas where E(i,j) is 1. The data processing unit 3 thus performs the object detection to detect the detection target object(s) S in the detection area R.

According to the object detection device 1 and the object detection method of the present embodiment, a detection target object is detected based on a logical product of a binary difference image C and a binary second derivative image D, so that even if multiple detection target objects are present in a detection area, the respective detection target objects can be separately detected. In other words, if multiple detection target objects are present in a detection area, the multiple detection target objects can be detected as separate detection target objects. Moreover, even if the image has low resolution, and the multiple detection target objects are close to each other, it is possible to separately detect the multiple detection target objects.

Further, since Laplacian filtering is performed to calculate second derivatives of a smoothed image F' so as to generate a binary second derivative image D, the calculation of the second derivatives of the smoothed image F' is required only once (for one image), making it possible to achieve reduction in memory usage and higher processing speed.

Note that in the present embodiment, it is possible to replace the Gaussian filtering by another smoothing process to be performed to generate the smoothed image F'. Further, it is possible to replace the Laplacian filtering by another second derivative calculation to be performed to calculate the second derivatives of the smoothed image F' so as to generate the binary second derivative image D.

Further, in the present embodiment, the detection target image F is not limited to the detection temperature image A at one time point, and can be an image obtained by averaging multiple detection temperature images A at a plurality of different time points.

Further, in the present embodiment, it is possible to set an area in the smoothed image F' to 1 (first value) where its second derivatives are either negative or 0 (i.e. equal to or lower than the threshold for the derivative), and to set the other area in the smoothed image F' (area where its second derivatives are positive) to 0 (second value), so as to generate a binary second derivative image D.

Further, in the present embodiment, the binary second derivative image D can be an image, which is obtained by binarizing second derivatives of the detection target image F with a predetermined threshold for the derivative, instead of an image which is obtained by binarizing, with a predetermined threshold for the derivative, the second derivatives of the smoothed image F' obtained by smoothing the detection target image F. More specifically, it is possible to set an area in the detection target image F to 1 (first value) where its second derivatives are negative (i.e. lower than the threshold for the derivative), and to set the other area in the detection target image F (area where its second derivatives are positive or 0) to 0 (second value), so as to generate a binary second derivative image D. Further, it is also possible to set an area in the detection target image F to 1 (first value) where its second derivatives are either negative or 0 (i.e. equal to or lower than the threshold for the derivative), and to set the other area in the detection target image F (area where its second derivatives are positive) to 0 (second value), so as to generate a binary second derivative image D.

Further, the object detection device 1 can also be applied to the case where the detection target object has a lower temperature than the background temperature in the detection area. In order to detect a detection target object with a lower temperature than the background temperature in the detection area, the data processing unit 3 (its binary difference image generation unit 31) sets an area to 1 (first value) where the difference value obtained by subtracting the detection target image F from the background image B is equal to or higher than the threshold for the difference value, and further sets an area to 0 (second value) where the difference value obtained by subtracting the detection target image F from the background image B is lower than the threshold for the difference value. By thus generating a binary difference image C, a detection target object with a lower temperature than the background temperature in the detection area can be detected. The data processing unit 3 (its binary second derivative image generation unit 32) sets an area in the smoothed image F' to 1 (first value) where its second derivatives are positive (i.e. higher than the threshold for the derivative), and further sets the other area to 0 (second value), so as to generate a binary second derivative image D.

Note that in the case of detecting a detection target object having a lower temperature than the background in the detection area, it is possible to set an area in the smoothed image F' to 1 where its second derivatives are either positive or 0 (i.e. equal to or higher than the threshold for the derivative), and to set the other area in the smoothed image F' (area where its second derivatives are negative) to 0, so as to generate a binary second derivative image D.

Further, in the case of detecting a detection target object having a lower temperature than the background in the detection area, the binary second derivative image D can be an image, which is obtained by binarizing second derivatives of the detection target image F with a predetermined threshold for the derivative, instead of an image which is obtained by binarizing the second derivatives of the smoothed image F' with a predetermined threshold for the derivative. More specifically, the data processing unit 3 (its binary second derivative image generation unit 32) can set an area in the detection target image F to 1 (first value) where its second derivatives are positive (i.e. higher than the threshold for the derivative), and set the other area in the detection target image F (area where its second derivatives are negative or 0) to 0 (second value), so as to generate a binary second derivative image D. Further, the data processing unit 3 (its binary second derivative image generation unit 32) can also set an area in the detection target image F to 1 (first value) where its second derivatives are either positive or 0 (i.e. equal to or higher than the threshold for the derivative), and set the other area in the detection target image F (area where its second derivatives are negative) to 0 (second value), so as to generate a binary second derivative image D.

[Second Embodiment]

Next, an object detection device and an object detection method according to a second embodiment will be described. The object detection device 1 and the object detection method of the present embodiment are different from the first embodiment in the object detection (method of detecting a detection target object S). As for the other structures, the present embodiment is the same as the first embodiment.

Figure 8:
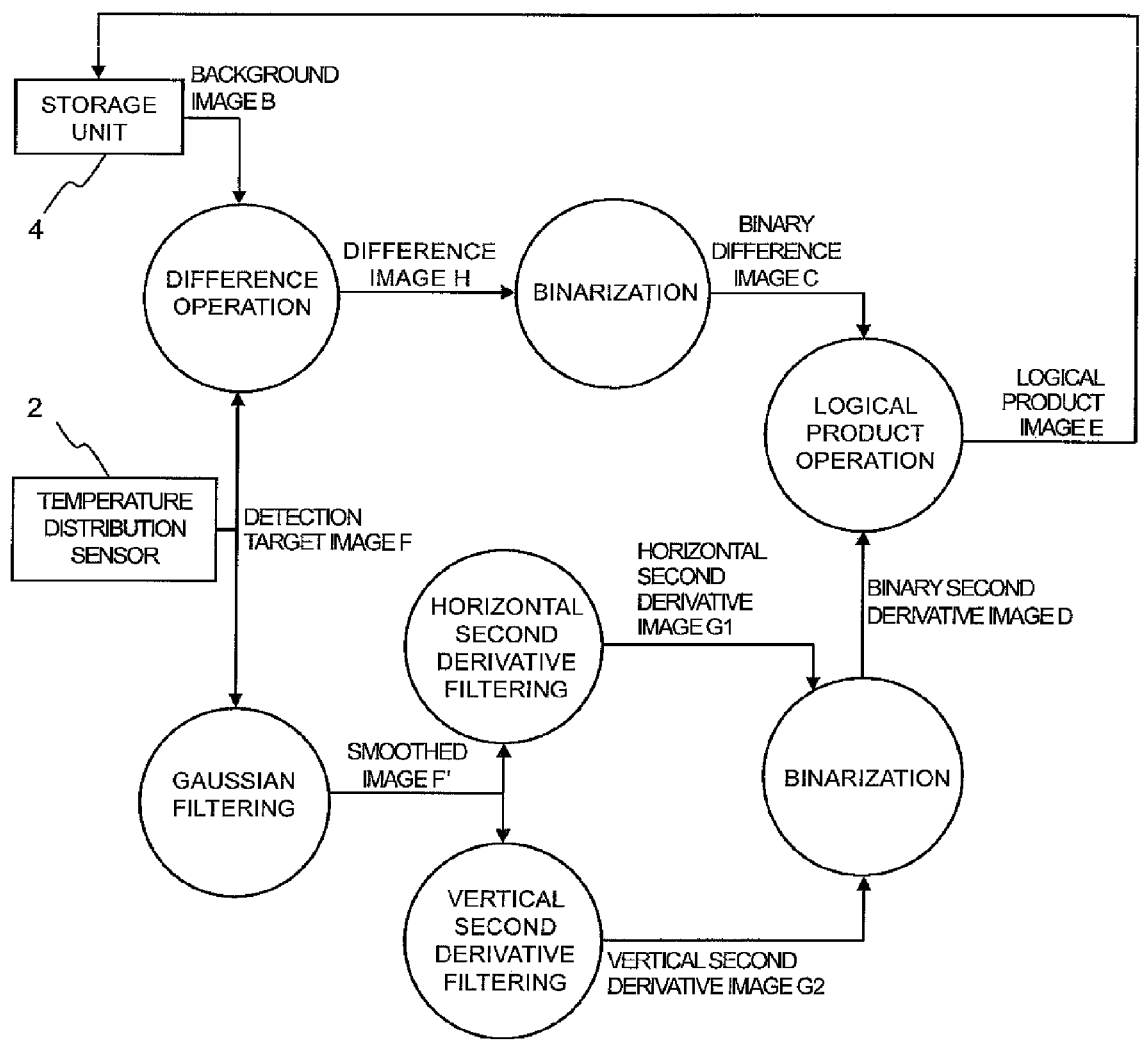
FIG. 8 is a view showing a process flow in an object detection of an object detection device according to a second embodiment of the present invention.

FIG. 8 shows a process flow in the object detection of the present embodiment. The object detection of the present embodiment is different from the first embodiment in the process of generating a binary second derivative image D(x, y). As for the other processes (process of generating a binary difference image C(x,y) and process of generating a logical product image E(x,y)), the object detection of the present embodiment is the same as the first embodiment.

In the present embodiment, the data processing unit 3 (its binary second derivative image generation unit 32) generates a binary second derivative image D(x,y) as follows.

First, the data processing unit 3 generates a smoothed image F'(x,y) similarly as in the first embodiment.

Subsequently, the data processing unit 3 (its binary second derivative image generation unit 32) performs horizontal second derivative filtering on the smoothed image F'(x,y) to generate a horizontal second derivative image G1(x,y). More specifically, the data processing unit 3 performs horizontal second derivative filtering on the smoothed image F'(x,y) to calculate a horizontal second derivative of the smoothed image F'(x,y) at x=i, y=j for each i and j. The horizontal second derivative of the smoothed image F'(x,y) at x=i, y=j is calculated using horizontal second derivative filtering, with predetermined horizontal second derivative filter coefficients, based on the values of a pixel of the smoothed image F'(x,y) at x=i, y=j and its surrounding pixels. The data processing unit 3 generates the horizontal second derivative image G1(x, y) by determining, as G1(i,j), a horizontal second derivative of the smoothed image F'(x,y) at x=i, y=j for each i and j.

In the generation of the horizontal second derivative image G1(x,y), the data processing unit 3 performs horizontal second derivative filtering, using horizontal second derivative filter coefficients $m_{1,1}, m_{1,2}, m_{1,3}, m_{2,1}, m_{2,2}, m_{2,3}, m_{3,1}, m_{3,2},$ and $m_{3,3}$ in 3 rows and 3 columns shown in FIG. 9, to calculate G1(i,j): G1(i,j)=$-1 \times (m_{1,1} \times$F'(i-1,j-1)+$m_{1,2} \times$F'(i-1,j)+$m_{1,3} \times$ F'(i-1,j+1)+$m_{2,1} \times$F'(i,j-1)+$m_{2,2} \times$F'(i,j)+$m_{2,3} \times$F'(i,j+1)+ $m_{3,1} \times$F'(i+1,j-1)+$m_{3,2} \times$F'(i+1,j)+$m_{3,3} \times$F'(i+1,j+1)). In the example shown in FIG. 9, $m_{1,1}$=-1, $m_{1,2}$=0, $m_{1,3}$=-1, $m_{2,1}$=-1, $m_{2,2}$=6, $m_{2,3}$=-1, $m_{3,1}$=-1, $m_{3,2}$=0, and $m_{3,3}$=-1.

Assume that an area of 3 rows and 3 columns in the smoothed image F'(x,y) has values (i.e. values of a pixel of the smoothed image F'(x,y) at x=i, y=j and its surrounding pixels) which are, for example, the values shown in FIG. 7 described above. In this case, the horizontal second derivative G1(i,j) of the smoothed image F'(x,y) at x=i, y=j as calculated using the horizontal second derivative filter coefficients shown in FIG. 9 is G1(i,j)=-4.

Further, the data processing unit 3 (its binary second derivative image generation unit 32) performs vertical second derivative filtering on the smoothed image F'(x,y) to generate a vertical second derivative image G2(x,y). More specifically, the data processing unit 3 performs vertical second derivative filtering on the smoothed image F'(x,y) to calculate a vertical second derivative of the smoothed image F'(x,y) at x=i, y=j for each i and j. The vertical second derivative of the smoothed image F'(x,y) at x=i, y=j is calculated using vertical second derivative filtering, with predetermined vertical second derivative filter coefficients, based on the values of a pixel of the smoothed image F'(x,y) at x=i, y=j and its surrounding pixels. The data processing unit 3 generates the vertical second derivative image G2(x,y) by determining, as G2(i,j), a vertical second derivative of the smoothed image F'(x,y) at x=i, y=j for each i and j.

In the generation of the vertical second derivative image G2(x,y), the data processing unit 3 performs vertical second derivative filtering, using vertical second derivative filter coefficients $n_{1,1}, n_{1,2}, n_{1,3}, n_{2,1}, n_{2,2}, n_{2,3}, n_{3,1}, n_{3,2},$ and $n_{3,3}$ in 3 rows and 3 columns shown in FIG. 10, to calculate G2(i,j): G2(i,j)=$-1 \times (n_{1,1} \times$F'(i-1,j-1)+$n_{1,2} \times$F'(i-1,j)+$n_{1,3} \times$F'(i-1,j+ 1)+$n_{2,1} \times$F'(i,j-1)+$n_{2,2} \times$F'(i,j)+$n_{2,3} \times$F'(i,j+1)+$n_{3,1} \times$F'(i+1,j- 1)+$n_{3,2} \times$F'(i+1,j)+$n_{3,3} \times$F'(i+1,j+1)). In the example shown in FIG. 10, $n_{1,1}$=-1, $n_{1,2}$=-1, $n_{1,3}$=-1, $n_{2,1}$=0, $n_{2,2}$=6, $n_{2,3}$=0, $n_{3,1}$=-1, $n_{3,2}$=-1, and $n_{3,3}$=-1.

Assume that an area of 3 rows and 3 columns in the smoothed image F'(x,y) has values (i.e. values of a pixel of the smoothed image F'(x,y) at x=i, y=j and its surrounding pixels) which are, for example, the values shown in FIG. 7 described above. In this case, the vertical second derivative G2(i,j) of the smoothed image F'(x,y) at x=i, y=j as calculated using the vertical second derivative filter coefficients shown in FIG. 10 is G2(i,j)=2.

Then, the data processing unit 3 (its binary second derivative image generation unit 32) generates a binary second derivative image D(x,y). More specifically, the data processing unit 3 (its binary second derivative image generation unit 32) sets an area to 1 (first value) where both G1(i,j) and G2(i,j) are negative (i.e. lower than the threshold for the derivative) for each i and j of i=1, 2, . . . , u; j=1, 2, . . . , v, and further sets an area to 0 (second value) where at least one of G1(i,j) and G2(i,j) is not negative (i.e. at least one of them is either positive or 0). In other words, the data processing unit 3 sets D(i,j) to 1 if both G1(i,j) and G2(i,j) are negative for each i and j of i=1, 2, . . . , u; j=1, 2, . . . , v, and further sets D(i,j) to 0 if at least one of G1(i,j) and G2(i,j) is not negative (i.e. at least one of them is either positive or 0). The data processing unit 3 thus generates the binary second derivative image D(x,y). The value of D(x,y) at x=i, y=j is D(i,j).

Now compare the generation of the binary second derivative image D(x,y) by the method of the first embodiment with the generation of the binary second derivative image D(x,y) by the method of the present embodiment. The method of the first embodiment is a method to calculate second derivatives using Laplacian filtering to generate a binary second derivative image D(x,y). The method of the present embodiment is a method to calculate horizontal second derivatives and vertical second derivatives to generate a binary second derivative image D(x,y).

For example, we consider the area in the smoothed image F'(x,y) shown in FIG. 7 described above. More specifically, we consider the case where a second derivative of the smoothed image F'(x,y) in its area at x=i, y=j is calculated to determine D(i,j), which is the value of the binary second derivative image D(x,y) at x=i, y=j.

The method of the first embodiment described above is as follows. That is, Laplacian filtering is performed using the Laplacian filter coefficients in 3 rows and 3 columns shown in FIG. 6 to calculate G(i,j), which is the second derivative of the smoothed image F'(x,y) in its area at x=i, y=j shown in FIG. 7, to obtain G(i,j)=-2. Thus, G(i,j) is negative, so that the value D(i,j) of the binary second derivative image D(x,y) at x=i, y=j is 1.

On the other hand, the method of the present embodiment is as follows. Horizontal second derivative filtering is performed using the horizontal second derivative filter coefficients shown in FIG. 9 to calculate G1(i,j), which is the horizontal second derivative of the smoothed image F'(x,y) in its area at x=i, y=j shown in FIG. 7, to obtain G1(i,j)=-4. Further, vertical second derivative filtering is performed using the vertical second derivative filter coefficients shown in FIG. 10 to calculate G2(i,j), which is the vertical second derivative of the smoothed image F'(x,y) in its area at x=i, y=j shown in FIG. 7, to obtain G2(i,j)=2. Thus, at least one of G1(i,j) and G2(i,j) is not negative (G2 is positive), so that the value D(i,j) of the binary second derivative image D(x,y) at x=i, y=j is 0.

Thus, in the example shown in FIG. 7, the value D(i,j) of the binary second derivative image D(x,y) at x=i, y=j according to the method of the first embodiment is different from that according to the method of the present embodiment. In other words, the results may be different between the case where the binary second derivative image D(x,y) is generated by the first embodiment and the case where the binary second derivative image D(x,y) is generated by the present embodiment.

Similarly as in the first embodiment, the object detection device 1 and the object detection method according to the present embodiment make it possible that even if multiple detection target objects are present in a detection area, the respective detection target objects can be separately detected. Moreover, even in the case where the detection target objects cannot be separately detected by Laplacian filtering to calculate second derivatives to generate a binary second derivative image D, the detection target objects can be separately detected by calculating horizontal second derivatives and vertical second derivatives to generate a binary second derivative image D.

Note that in the present embodiment, the data processing unit 3 (its binary second derivative image generation unit 32) can set an area in the smoothed image F' to 1 where both its horizontal second derivatives and its vertical second derivatives are either negative or 0 (i.e. equal to or lower than the threshold for the derivative), and set the other area in the smoothed image F' to 0, so as to generate a binary second derivative image D. In other words, it is possible to set an area to 1 where both G1(i,j) and G2(i,j) are either negative or 0, and to set an area to 0 where at least one of G1(i,j) and G2(i,j) is not negative or 0 (i.e. at least one of them is positive), so as to generate a binary second derivative image D.

Further, in the present embodiment, the data processing unit 3 (its binary second derivative image generation unit 32) can generate a binary second derivative image D based on horizontal second derivatives and vertical second derivatives of the detection target image F instead of the horizontal second derivatives and the vertical second derivatives of the smoothed image F'. More specifically, the data processing unit 3 (its binary second derivative image generation unit 32) can set an area in the detection target image F to 1 where both its horizontal second derivatives and its vertical second derivatives are negative (i.e. lower than the threshold for the derivative), and set the other area in the detection target image F to 0, so as to generate a binary second derivative image D. Further, the data processing unit 3 (its binary second derivative image generation unit 32) can set an area in the detection target image F to 1 where both its horizontal second derivatives and its vertical second derivatives are either negative or 0 (i.e. equal to or lower than the threshold for the derivative), and set the other area in the detection target image F to 0, so as to generate a binary second derivative image D. In other words, it is possible to perform horizontal second derivative filtering on the detection target image F to generate a horizontal second derivative image G1, and to perform vertical second derivative filtering on the detection target image F to generate a vertical second derivative image G2.

Further, in the present embodiment, the horizontal second derivative filter coefficients are not limited to the coefficients shown in FIG. 9, and can be coefficients such as shown in FIG. 11A and FIG. 11B. Further, the vertical second derivative filter coefficients are not limited to the coefficients shown in FIG. 10, and can be coefficients such as shown in FIG. 12A and FIG. 12B.

Further, in the case of detecting a detection target object having a lower temperature than the background in the detection area, the data processing unit 3 (its binary second derivative image generation unit 32) can set an area in the smoothed image F' to 1 where both its horizontal second derivatives and its vertical second derivatives are positive, and set the other area in the smoothed image F' to 0, so as to generate a binary second derivative image D. In other words, it is possible to set an area to 1 where both G1(i,j) and G2(i,j) are positive (i.e. higher than the threshold for the derivative), and to set an area to 0 where at least one of G1(i,j) and G2(i,j) is not positive (i.e. at least one of them is either negative or 0), so as to generate a binary second derivative image D.

Further, in the case of detecting a detection target object having a lower temperature than the background in the detection area, the data processing unit 3 (its binary second derivative image generation unit 32) can set an area in the smoothed image F' to 1 where both its horizontal second derivatives and its vertical second derivatives are either positive or 0 (i.e. equal to or higher than the threshold for the derivative), and set the other area in the smoothed image F' to 0, so as to generate a binary second derivative image D. In other words, it is possible to set an area to 1 where both G1(i,j) and G2(i,j) are either positive or 0, and to set an area to 0 where at least one of G1(i,j) and G2(i,j) is not positive or 0 (i.e. at least one of them is negative), so as to generate a binary second derivative image D.

Further, also in the case of detecting a detection target object having a lower temperature than the background in the detection area, the data processing unit 3 (its binary second derivative image generation unit 32) can generate a binary second derivative image D based on horizontal second derivatives and vertical second derivatives of the detection target image F instead of the horizontal second derivatives and the vertical second derivatives of the smoothed image F'. In this case, the data processing unit 3 (its binary second derivative image generation unit 32) can set an area in the detection target image F to 1 where both its horizontal second derivatives and its vertical second derivatives are positive (i.e. higher than the threshold for the derivative), and set the other area in target object image F to 0, so as to generate a binary second derivative image D. Further, the data processing unit 3 (its binary second derivative image generation unit 32) can set an area in the detection target image F to 1 where both its horizontal second derivatives and its vertical second derivatives are either positive or 0 (i.e. equal to or higher than the threshold for the derivative), and set the other area in the detection target image F to 0, so as to generate a binary second derivative image D.

[Third Embodiment]

Next, an object detection device and an object detection method according to a third embodiment will be described. The object detection device 1 and the object detection method of the present embodiment are different from the first embodiment in the object detection (method of detecting a detection target object S). As for the other structures, the present embodiment is the same as the first embodiment.

Figure 13:
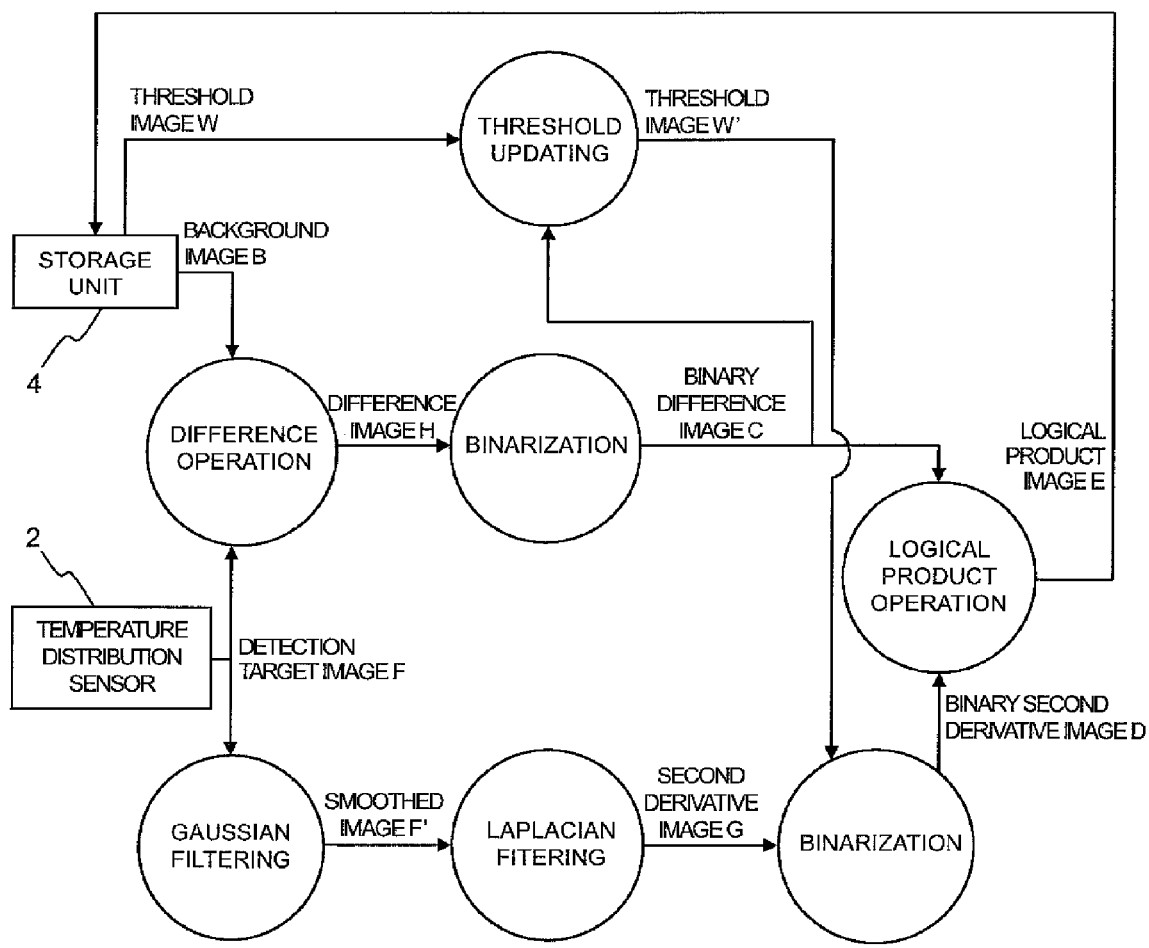
FIG. 13 is a view showing a process flow in an object detection of an object detection device according to a third embodiment of the present invention.

FIG. 13 shows a process flow in the object detection of the present embodiment. The object detection of the present embodiment is different from the first embodiment in the process of generating a binary second derivative image D(x,y). As for the other processes (process of generating a binary difference image C(x,y) and process of generating a logical product image E(x,y)), the object detection of the present embodiment is the same as the first embodiment.

In the present embodiment, the data processing unit 3 generates a binary second derivative image D(x,y) as follows.

First, the data processing unit 3 generates a smoothed image F'(x,y) similarly as in the first embodiment. Further, the data processing unit 3 generates a second derivative image G(x,y) similarly as in the first embodiment.

Then, the data processing unit 3 binarizes the second derivative image $G(x,y)$ to generate a binary second derivative image $D(x,y)$. However, in contrast to the first embodiment, the data processing unit 3 (its binary second derivative image generation unit 32) uses different values as a threshold for the derivative, depending on area.

More specifically, the data processing unit 3 uses different values as a threshold for the derivative, depending on the area in the binary difference image $C(x,y)$ where its value is 1. Even more specifically, the data processing unit 3 updates a threshold image $W(x,y)$ based on the value $C(i,j)$ of the binary difference image $C(x,y)$ to generate a threshold image $W'(x,y)$. Here, $W'(i,j)$ which is the value of the threshold image $W'(x,y)$ at $x=i$, $y=j$ is a threshold for the derivative to binarize the value $G(i,j)$ of the second derivative image $G(x,y)$ at $x=i$, $y=j$.

Here, the data processing unit 3 (its binary second derivative image generation unit 32) lowers the threshold for the derivative (lowers it from 0 to a negative value) for an area in the binary difference image $C(x,y)$ corresponding to an area therein where its value is 1 and to its neighboring area, and raises the threshold for the derivative (raises it from 0 to a positive value) for the other area. In other words, the data processing unit 3 lowers the value $W(i,j)$ to $W'(i,j)$ for an area corresponding to an area where $C(i,j)$ is 1 and to its neighboring area, and raises the value $W(i,j)$ to $W'(i,j)$ for the other area. Thus, the threshold for the derivative for an area in the binary difference image $C(x,y)$ corresponding to an area therein where its value is 1 and to its neighboring area becomes lower than the threshold for the derivative for the other area.

Then, the data processing unit 3 (its binary second derivative image generation unit 32) thus uses different thresholds $W'(i,j)$, depending on the area, to binarize the second derivative image $G(x,y)$ so as to generate a binary second derivative image $D(x,y)$. More specifically, the data processing unit 3 sets an area to 1 (first value) where $G(i,j)$ is lower than the threshold $W'(i,j)$ for the derivative for each i and j of $i=1, 2, \ldots, u; j=1, 2, \ldots, v$, and further sets an area to 0 (second value) where $G(i,j)$ is equal to or higher than the threshold $W'(i,j)$ for the derivative. In other words, the data processing unit 3 sets $D(i,j)$ to 1 if $G(i,j)$ is lower than the threshold $W'(i,j)$ for the derivative for each i and j of $i=1, 2, \ldots, u; j=1, 2, \ldots, v$, and further sets $D(i,j)$ to 0 if $G(i,j)$ is equal to or higher than the threshold $W'(i,j)$ for the derivative. The data processing unit 3 thus generates the binary second derivative image $D(x,y)$.

Similarly as in the first embodiment, the object detection device 1 and the object detection method according to the present embodiment make it possible that even if multiple detection target objects are present in a detection area, the respective detection target objects can be separately detected. Moreover, the use of different values as a threshold for the derivative, depending on area, makes it possible to prevent a single detection target object from being erroneously detected as multiple detection target objects separately, and to more reliably detect multiple detection target objects separately.

Note that in the case of detecting a detection target object having a lower temperature than the background in the detection area, the data processing unit 3 (its binary second derivative image generation unit 32) raises the threshold for the derivative (raises it from 0 to a positive value) for an area in the binary difference image C corresponding to an area therein where its value is 1 and to its neighboring area, and lowers the threshold for the derivative (lowers it from 0 to a negative value) for the other area. Thus, the threshold for the derivative for an area in the binary difference image $C(x,y)$ corresponding to an area therein where its value is 1 and to its neighboring area becomes higher than the threshold for the derivative for the other area.

[Fourth Embodiment]

Next, an object detection device and an object detection method according to a fourth embodiment will be described. The object detection device 1 and the object detection method of the present embodiment are different from the first embodiment in the object detection (method of detecting a detection target object S). As for the other structures, the present embodiment is the same as the first embodiment.

Figure 14:
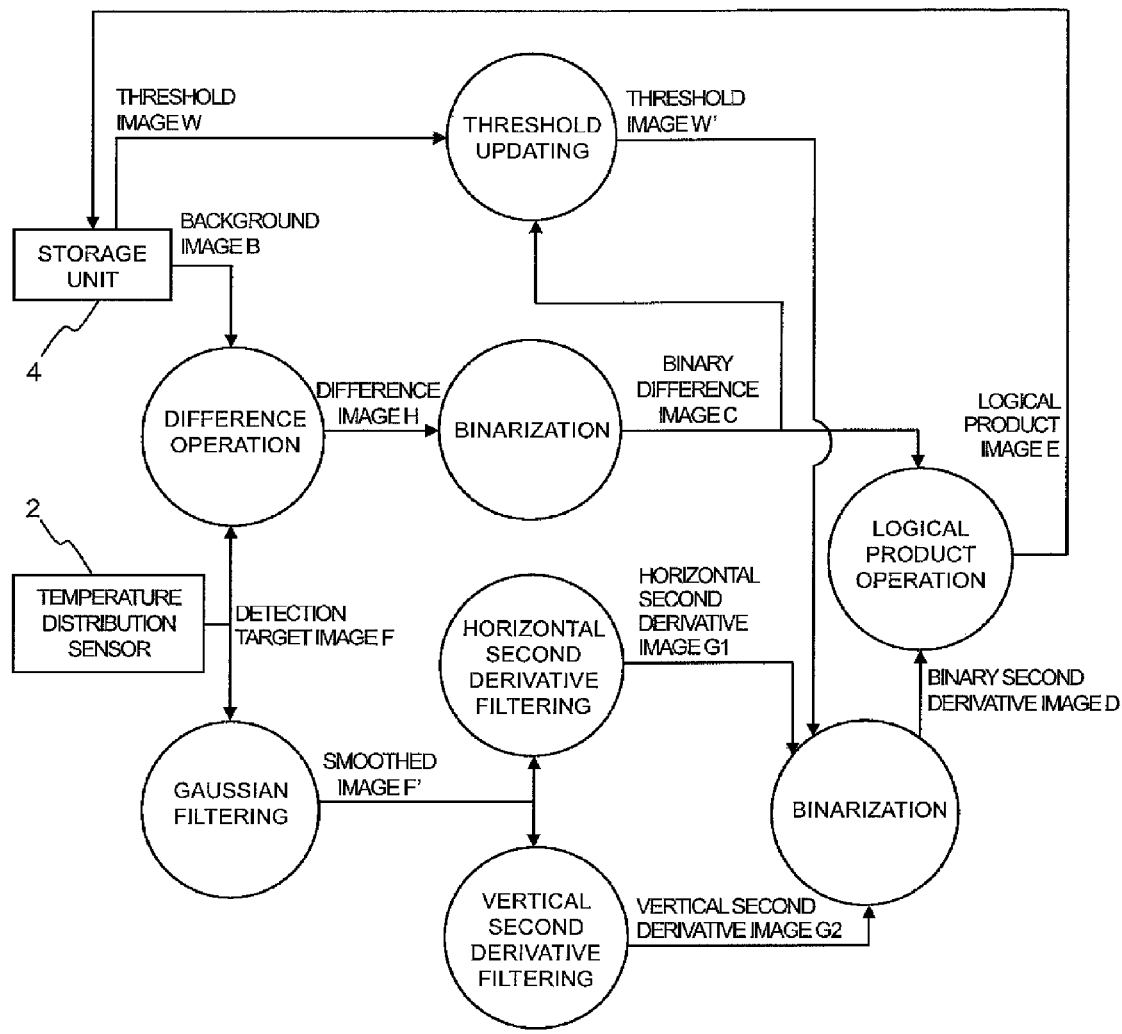
FIG. 14 is a view showing a process flow in an object detection of an object detection device according to a fourth embodiment of the present invention.

FIG. 14 shows a process flow in the object detection of the present embodiment. The object detection of the present embodiment is different from the first embodiment in the process of generating a binary second derivative image $D(x,y)$. As for the other processes (process of generating a binary difference image $C(x,y)$ and process of generating a logical product image $E(x,y)$), the object detection of the present embodiment is the same as the first embodiment.

In the present embodiment, the data processing unit 3 (its binary second derivative image generation unit 32) generates a binary second derivative image $D(x,y)$ as follows.

First, the data processing unit 3 generates a smoothed image $F'(x,y)$ similarly as in the first embodiment. Subsequently, the data processing unit 3 performs horizontal second derivative filtering on the smoothed image $F'(x,y)$ to generate a horizontal second derivative image $G1(x,y)$ similarly as in the second embodiment. Further, the data processing unit 3 performs vertical second derivative filtering on the smoothed image $F'(x,y)$ to generate a vertical second derivative image $G2(x,y)$ similarly as in the second embodiment.

Then, the data processing unit 3 generates a binary second derivative image $D(x,y)$. However, in contrast to the second embodiment, the data processing unit 3 uses different values as a threshold for the derivative, depending on area. Here, similarly as in the third embodiment, the data processing unit 3 uses different values as a threshold for the derivative, depending on the area in the binary difference image $C(x,y)$ where its value is 1.

More specifically, similarly as in the third embodiment, the data processing unit 3 updates the threshold image $W(x,y)$ based on the value $C(i,j)$ of the binary difference image $C(x,y)$ to generate a threshold image $W'(x,y)$. Even more specifically, similarly as in the third embodiment, the data processing unit 3 lowers the value $W(i,j)$ to $W'(i,j)$ for an area corresponding to an area where $C(i,j)$ is 1 and to its neighboring area, and raises the value $W(i,j)$ to $W'(i,j)$ for the other area.

Then, the data processing unit 3 thus uses different thresholds $W'(i,j)$, depending on the area, to generate a binary second derivative image $D(x,y)$. More specifically, the data processing unit 3 sets an area to 1 (first value) where both $G1(i,j)$ and $G2(i,j)$ are lower than the threshold $W'(i,j)$ for the derivative for each i and j of $i=1, 2, \ldots, u; j=1, 2, \ldots, v$, and further sets an area to 0 (second value) where at least one of $G1(i,j)$ and $G2(i,j)$ is equal to or higher than the threshold $W'(i,j)$ for the derivative. In other words, the data processing unit 3 sets $D(i,j)$ to 1 if both $G1(i,j)$ and $G2(i,j)$ are lower than the threshold $W'(i,j)$ for the derivative for each i and j of $i=1, 2, \ldots, u; j=1, 2, \ldots, v$, and further sets $D(i,j)$ to 0 if at least one of $G1(i,j)$ and $G2(i,j)$ is equal to or higher than the threshold $W'(i,j)$ for the derivative. The data processing unit 3 thus generates the binary second derivative image $D(x,y)$.

Similarly as in the first embodiment, the object detection device 1 and the object detection method according to the present embodiment make it possible that even if multiple detection target objects are present in a detection area, the respective detection target objects can be separately detected. Moreover, similarly as in the second embodiment, it is possible to detect what cannot be detected by Laplacian filtering to calculate second derivatives to generate a binary second derivative image D. Further, similarly as in the third embodiment, it is possible to prevent a single detection target object from being erroneously detected as multiple detection target objects separately, and to more reliably detect multiple detection target objects separately.

[Fifth Embodiment]

Next, an object detection device and an object detection method according to a fifth embodiment will be described. The object detection device 1 and the object detection method of the present embodiment are different from the first embodiment in the object detection (method of detecting a detection target object S). As for the other structures, the present embodiment is the same as the first embodiment.

The object detection of the present embodiment is different from the first embodiment in the process of generating a binary second derivative image D(x,y). As for the other processes (process of generating a binary difference image C(x, y) and process of generating a logical product image E(x,y)), the object detection of the present embodiment is the same as the first embodiment.

In the present embodiment, the data processing unit 3 (its binary second derivative image generation unit 32) generates a binary second derivative image D(x,y) as follows.

First, the data processing unit 3 generates a smoothed image F'(x,y) similarly as in the first embodiment.

Here, the data processing unit 3 (its binary second derivative image generation unit 32) sets, as a high-temperature area, an area in the smoothed image F'(x,y) which corresponds to an area in the binary difference image C(x,y) where its value C(i,j) is 1. Subsequently, the data processing unit 3 calculates a major axis direction of the high-temperature area. Then, the data processing unit 3 calculates second derivatives of the smoothed image F'(x,y) in the major axis direction to generate a second derivative image G(x,y). More specifically, the data processing unit 3 performs second derivative filtering on the smoothed image F'(x,y) to calculate its second derivatives in the major axis direction so as to calculate the second derivatives of the smoothed image F'(x,y) in the major axis direction. Further, the data processing unit 3 sets the second derivatives of the smoothed image F'(x,y) in the major axis direction to the values G(i,j) of the second derivative image G(x,y).

Further, if a plurality of high-temperature areas are separately present, the data processing unit 3 (its binary second derivative image generation unit 32) calculates a major axis direction of each of the separately present high-temperature areas. Further, the data processing unit 3 (its binary second derivative image generation unit 32) calculates second derivatives of each of the separately present high-temperature areas in the major axis direction of the each high-temperature area to generate a second derivative image G(x,y). More specifically, the data processing unit 3 performs second derivative filtering on each of the high-temperature areas in the smoothed image F'(x,y) to calculate second derivatives of the each high-temperature area in the major axis direction of the each high-temperature area so as to calculate the second derivatives of each of the high-temperature areas in the major axis direction of the each high-temperature area. Further, the data processing unit 3 determines the second derivatives of each of the high-temperature areas in the major axis direction of the each high-temperature area as the values G(i,j) of the second derivative image G(x,y) in the each high-temperature area.

Here, the data processing unit 3 does not perform second derivative filtering (does not calculate second derivatives) on areas other than the high-temperature areas, and sets the values G(i,j) of the second derivative image G(x,y) in the areas other than the high-temperature areas to 0. This is because, in the areas other than the high-temperature areas (the areas other than the high-temperature areas being those where the value C(i,j) of the binary difference image C(x,y) is 0), the value E(i,j) of the logical product image E(x,y) is 0 due to the logical product operation performed in a later stage, regardless of the values G(i,j).

Then, the data processing unit 3 (its binary second derivative image generation unit 32) binarizes the thus generated second derivative image G(x,y) similarly as in the first embodiment to generate a binary second derivative image D(x,y).

If a plurality of high-temperature areas are separately present, the data processing unit 3 (its binary second derivative image generation unit 32) calculates a major axis direction of each of the high-temperature areas and second derivatives of the each high-temperature area in the major axis direction of the each high-temperature area, as follows.

Figure 15A:
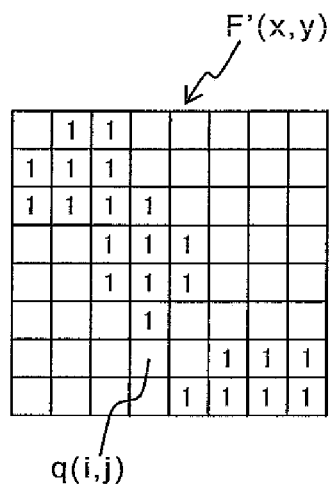
Figure 15B:
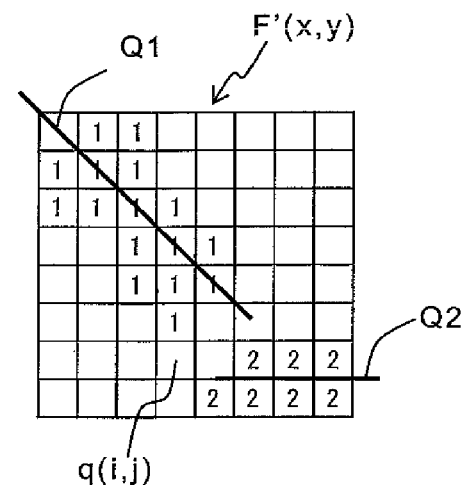
FIG. 15B is a view showing an example of major axis directions of the high-temperature areas in the smoothed image.

First, the data processing unit 3 performs labeling to assign a label L (L=1, 2, . . . ) to each of the separately present high-temperature areas (each pixel of the pixels forming the high-temperature area). For example, assume that high-temperature areas of the smoothed image F'(x,y) are present as shown in FIG. 15A. In the smoothed image F'(x,y) shown in FIG. 15A, the areas of the pixels q(i,j) denoted as "1" are high-temperature areas, while the areas of the pixels q(i,j) not denoted as "1" are low-temperature areas. In the smoothed image F'(x,y) shown in FIG. 15A, the high-temperature areas are separated into two, the two high-temperature areas being separately present. In this case, labels L are assigned as shown in FIG. 15B. In the smoothed image F'(x,y) shown in FIG. 15B, the pixels q(i,j) denoted as "1" represent pixels in the high-temperature area with assigned label L=1, while the pixels q(i,j) denoted as "2" represent pixels in the high-temperature area with assigned label L=2. Since the two high-temperature areas are separately present, label L=1 is assigned to one of the high-temperature areas, and label L=2 is assigned to the other high-temperature area.

Subsequently, the data processing unit 3 calculates a major axis direction of the high-temperature area with each label L. In the present embodiment, the data processing unit 3 uses the weighted least square method to calculate the major axis direction of each of the separately present high-temperature areas. In the example shown in FIG. 15B, the direction parallel to the straight line Q1 in the figure is the major axis direction of the high-temperature area with label L=1, while the direction parallel to the straight line Q2 in the figure is the major axis direction of the high-temperature area with label L=2.

Figure 16A:
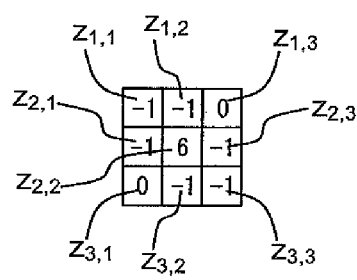
FIG. 16A and FIG. 16B are views showing an example of second derivative filter coefficients used in the object detection of the object detection device.
Figure 16B:
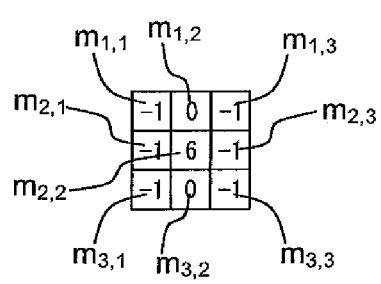

Then, the data processing unit 3 calculates second derivatives of each of the high-temperature areas with each label L in the major axis direction of the each high-temperature area. More specifically, the data processing unit 3 performs filtering on the high-temperature area with each label L to calculate the second derivatives of the high-temperature area with each label L in the major axis direction of the each high-temperature area. For example, it performs filtering on the high-temperature area with label L=1 shown in FIG. 15B, using second derivative filter coefficients $z_{1,1}$, $z_{1,2}$, $z_{1,3}$, $z_{2,1}$, $z_{2,2}$, $z_{2,3}$, $z_{3,1}$, $z_{3,2}$, and $z_{3,3}$ shown in FIG. 16A, to calculate second derivatives of the high-temperature area in its major axis direction. In the example shown in FIG. 16A, $z_{1,1}=-1$, $z_{1,2}=-1$, $z_{1,3}=0$, $z_{2,1}=-1$, $z_{2,2}=6$, $z_{2,3}=-1$, $z_{3,1}=0$, $z_{3,2}=-1$, and $z_{3,3}=-1$. Further, it performs filtering on the high-temperature area with label L=2 shown in FIG. 15B, using second derivative filter coefficients $m_{1,1}$, $m_{1,2}$, $m_{1,3}$, $m_{2,1}$, $m_{2,2}$, $m_{2,3}$, $m_{3,1}$, $m_{3,2}$, and $m_{3,3}$ shown in FIG. 16B, to calculate second derivatives of the high-temperature area in its major axis direction. In the example shown in FIG. 16B, $m_{1,1}=-1$, $m_{1,2}=0$, $m_{1,3}=-1$, $m_{2,1}=-1$, $m_{2,2}=6$, $m_{2,3}=-1$, $m_{3,1}=-1$, $m_{3,2}=0$, and $m_{3,3}=-1$.

Similarly as in the first embodiment, the object detection device 1 and the object detection method of the present embodiment make it possible that even if multiple detection target objects are present in a detection area, the respective detection target objects can be separately detected. Moreover, the calculation of second derivatives of a high-temperature area (area corresponding to an area where the value of the binary difference image C is 1) in its major axis direction to generate a binary second derivative image D makes it possible to more reliably detect multiple detection target objects separately.

Note that in the present embodiment, the major axis direction of each of the high-temperature areas can be calculated using e.g. the principal component analysis, not limited to the weighted least square method. Further, if in one high-temperature area there are two positions where the temperature has a maximum value, the direction connecting the two positions where the temperature has a maximum value can be used as a major axis direction.

The present application is based on Japanese Patent Application 2011-277550, the content of which is to be consequently incorporated into the present invention by reference to the specification and the drawings of the above Patent Application. The present invention has been sufficiently described by the embodiments with reference to the attached drawings, but it would be obvious to a person of ordinary skill in the art that various changes and modifications are possible. Accordingly, such changes and modifications should be construed to fall within the scope of the present invention without departing from the scope of the present invention.

The invention claimed is:

1. An object detection device comprising:
    a binary difference image generation unit for generating a binary difference image by binarizing a difference value, with a predetermined threshold for the difference value, between: a background image which is an image showing a temperature distribution in a detection area and which is an image as a reference for the absence of a detection target object in the detection area; and a detection target image which is an image showing a temperature distribution in the detection area and which is an image as a detection target to detect a detection target object in the detection area;
    a binary second derivative image generation unit for generating a binary second derivative image by binarizing second derivatives of the detection target image or of a smoothed image, obtained by smoothing the detection target image, with a predetermined threshold for the derivative; and
    an object detection unit for detecting the detection target object based on a logical product of the binary difference image and the binary second derivative image.

2. The object detection device according to claim 1, which detects the detection target object having a higher temperature than background temperature in the detection area,
    wherein the binary difference image generation unit sets an area to a first value where the difference value obtained by subtracting the background image from the detection target image is equal to or higher than the threshold for the difference value, and further sets an area to a second value where the difference value obtained by subtracting the background image from the detection target image is lower than the threshold for the difference value, so as to generate the binary difference image, and
    wherein the binary second derivative image generation unit sets the threshold for the derivative to 0, and sets an area in the detection target image or the smoothed image to the first value where its second derivatives are lower than the threshold for the derivative, or where its second derivatives are equal to or lower than the threshold for the derivative, while setting the other area therein to the second value, so as to generate the binary second derivative image.

3. The object detection device according to claim 1,
    which detects the detection target object having a lower temperature than background temperature in the detection area,
    wherein the binary difference image generation unit sets an area to a first value where the difference value obtained by subtracting the detection target image from the background image is equal to or higher than the threshold for the difference value, and further sets an area to a second value where the difference value obtained by subtracting the detection target image from the background image is lower than the threshold for the difference value, so as to generate the binary difference image, and
    wherein the binary second derivative image generation unit sets the threshold for the derivative to 0, and sets an area in the detection target image or the smoothed image to the first value where its second derivatives are higher than the threshold for the derivative, or where its second derivatives are equal to or higher than the threshold for the derivative, while setting the other area therein to the second value, so as to generate the binary second derivative image.

4. The object detection device according to claim 1,
    wherein the binary second derivative image generation unit performs Laplacian filtering on the detection target image or the smoothed image to calculate the second derivatives of the detection target image or of the smoothed image, and binarizes, with the threshold for the derivative, the second derivatives thus calculated by performing Laplacian filtering, so as to generate the binary second derivative image.

5. The object detection device according to claim 2,
    wherein the binary second derivative image generation unit calculates horizontal second derivatives and vertical second derivatives of the detection target image or of the smoothed image, and sets an area therein to the first value where both its horizontal second derivatives and its vertical second derivatives are lower than the threshold for the derivative, or where both are equal to or lower than the threshold for the derivative, while setting the other area therein to the second value, so as to generate the binary second derivative image.

6. The object detection device according to claim 3,
    wherein the binary second derivative image generation unit calculates horizontal second derivatives and vertical second derivatives of the detection target image or of the smoothed image, and sets an area therein to the first value where both its horizontal second derivatives and its vertical second derivatives are higher than the threshold for the derivative, or where both are equal to or higher than the threshold for the derivative, while setting the other area therein to the second value, so as to generate the binary second derivative image.

7. The object detection device according to claim 2,
wherein the binary second derivative generation unit:
uses different values as the threshold for the derivative, depending on the area in the detection target image or the smoothed image; and
lowers the threshold for the derivative from 0 to a negative value for an area in the detection target image or the smoothed image corresponding to an area therein where the value of the binary difference image is the first value and to its neighboring area, and raises the threshold for the derivative from 0 to a positive value for the other area.

8. The object detection device according to claim 3,
wherein the binary second derivative generation unit:
uses different values as the threshold for the derivative, depending on the area in the detection target image or the smoothed image; and
raises the threshold for the derivative from 0 to a positive value for an area in the detection target image or the smoothed image corresponding to an area therein where the value of the binary difference image is the first value and to its neighboring area, and lowers the threshold for the derivative from 0 to a negative value for the other area.

9. The object detection device according to claim 2,
wherein the binary second derivative image generation unit:
sets an area in the binary difference image as a high-temperature area where its value is the first value, and calculates a major axis direction of the high-temperature area;
calculates second derivatives of the detection target image or the smoothed image in the major axis direction; and
binarizes the second derivatives with the threshold for the derivative, so as to generate the binary second derivative image.

10. The object detection device according to claim 9,
wherein if a plurality of the high-temperature areas are separately present, the binary second derivative image generation unit:
calculates a major axis direction of each of the high-temperature areas; and
calculates second derivatives of the each high-temperature area in the major axis direction for an area, corresponding to the each high-temperature area, in the detection target image or the smoothed image, and binarizes the second derivatives with the threshold for the derivative, so as to generate the binary second derivative image.

11. An object detection method comprising:
a step of generating a background image based on an output of a temperature distribution sensor to detect a temperature distribution in a detection area, wherein the background image is an image showing the temperature distribution in the detection area and which is an image as a reference for the absence of a detection target object in the detection area;
a step of generating a detection target image based on the output of the temperature distribution sensor, wherein the detection target image is an image showing a temperature distribution in the detection area and which is an image as a detection target to detect the detection target object in the detection area;
a step of generating a binary difference image by binarizing a difference value between the background image and the detection target image with a predetermined threshold for the difference value;
a step of generating a binary second derivative image by binarizing second derivatives of the detection target image or of a smoothed image, obtained by smoothing the detection target image, with a predetermined threshold for the derivative; and
a step of detecting the detection target object based on a logical product of the binary difference image and the binary second derivative image.

12. The object detection method according to claim 11,
wherein the object detection method detects the detection target object having a higher temperature than background temperature in the detection area,
wherein the step of generating the binary difference value is a step of setting an area to a first value where the difference value obtained by subtracting the background image from the detection target image is equal to or higher than the threshold for the difference value, and further setting an area to a second value where the difference value obtained by subtracting the background image from the detection target image is lower than the threshold for the difference value, so as to generate the binary difference image, and
wherein the step of generating the binary second derivative image is a step of setting the threshold for the derivative to 0, and setting an area in the detection target image or the smoothed image to the first value where its second derivatives are lower than the threshold for the derivative, or where its second derivatives are equal to or lower than the threshold for the derivative, while setting the other area therein to the second value, so as to generate the binary second derivative image.

13. The object detection method according to claim 11,
wherein the object detection method detects the detection target object having a lower temperature than background temperature in the detection area,
wherein the step of generating the binary difference image is a step of setting an area to a first value where the difference value obtained by subtracting the detection target image from the background image is equal to or higher than the threshold for the difference value, and further setting an area to a second value where the difference value obtained by subtracting the detection target image from the background image is lower than the threshold for the difference value, so as to generate the binary difference image, and
wherein the step of generating the binary second derivative image is a step of setting the threshold for the derivative to 0, and setting an area in the detection target image or the smoothed image to the first value where its second derivatives are higher than the threshold for the derivative, or where its second derivatives are equal to or higher than the threshold for the derivative, while setting the other area therein to the second value, so as to generate the binary second derivative image.

14. The object detection method according to claim 11,
wherein the step of generating the binary second derivative image includes:
a step of performing Laplacian filtering on the detection target image or the smoothed image to calculate the second derivatives of the detection target image or of the smoothed image; and
a step of binarizing, with the threshold for the derivative, the second derivatives thus calculated by performing Laplacian filtering.

15. The object detection method according to claim 12,
wherein the step of generating the binary second derivative image includes:

a step of calculating horizontal second derivatives and vertical second derivatives of the detection target image or of the smoothed image; and a step of setting an area therein to the first value where both its horizontal second derivatives and its vertical second derivatives are lower than the threshold for the derivative, or where both are equal to or lower than the threshold for the derivative, while setting the other area therein to the second value.

16. The object detection method according to claim 13, wherein the step of generating the binary second derivative image includes:

a step of calculating horizontal second derivatives and vertical second derivatives of the detection target image or of the smoothed image; and a step of setting an area therein to the first value where both its horizontal second derivatives and its vertical second derivatives are higher than the threshold for the derivative, or where both are equal to or higher than the threshold for the derivative, while setting the other area therein to the second value.

17. The object detection method according to claim 12, wherein the threshold for the derivative for an area in the detection target image or the smoothed image, corresponding to an area therein where the value of the binary difference image is the first image and to its neighboring area, is lower than the threshold for the derivative for the other area.

18. The object detection method according to claim 13, wherein the threshold for the derivative for an area in the detection target image or the smoothed image, corresponding to an area therein where the value of the binary difference image is the first image and to its neighboring area, is higher than the threshold for the derivative for the other area.

19. The object detection method according to claim 12, wherein the step of generating the binary second derivative image includes:

a step of setting an area in the binary difference image as a high-temperature area where its value is the first value, and calculating a major axis direction of the high-temperature area;

a step of calculating second derivatives of the detection target image or the smoothed image in the major axis direction; and a step of binarizing the second derivatives, as calculated, with the threshold for the derivative.

20. The object detection method according to claim 19, wherein if a plurality of the high-temperature areas are separately present, the step of calculating the major axis direction is a step of calculating a major axis direction of each of the high-temperature areas, and wherein the step of calculating the second derivatives is a step of calculating second derivatives of the each high-temperature area in the major axis direction for an area, corresponding to the each high-temperature area, in the detection target image or the smoothed image.

\* \* \* \* \*